(12) United States Patent
Centonza et al.

(10) Patent No.: US 10,708,972 B2
(45) Date of Patent: Jul. 7, 2020

(54) RADIO LINK MANAGEMENT IN A SPLIT RAN ARCHITECTURE

(71) Applicant: Telefonaktiebolaget LM Ericsson (publ), Stockholm (SE)

(72) Inventors: Angelo Centonza, Winchester (GB); Matteo Fiorani, Solna (SE); Alexander Vesely, Feldbach (AT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 40 days.

(21) Appl. No.: 16/306,369

(22) PCT Filed: Jun. 15, 2018

(86) PCT No.: PCT/SE2018/050634
§ 371 (c)(1),
(2) Date: Nov. 30, 2018

(87) PCT Pub. No.: WO2019/035752
PCT Pub. Date: Feb. 21, 2019

(65) Prior Publication Data
US 2020/0084821 A1 Mar. 12, 2020

Related U.S. Application Data

(60) Provisional application No. 62/546,918, filed on Aug. 17, 2017.

(51) Int. Cl.
*H04W 76/20* (2018.01)
*H04W 76/16* (2018.01)
(Continued)

(52) U.S. Cl.
CPC ........... *H04W 76/20* (2018.02); *H04W 24/10* (2013.01); *H04W 76/16* (2018.02); *H04W 88/085* (2013.01)

(58) Field of Classification Search
None
See application file for complete search history.

(56) References Cited

U.S. PATENT DOCUMENTS 10,177,886 B2 * 1/2019 Miao ..................... H04W 76/15
10,568,004 B2 * 2/2020 Sang ................. H04W 36/0055
(Continued)

FOREIGN PATENT DOCUMENTS

EP 3099108 A1 11/2016
WO 2013190775 A1 12/2013

OTHER PUBLICATIONS

"3GPP TS 23.401 V14.4.0", 3rd Generation Partnership Project; Technical Specification Group Services and System Aspects; General Packet Radio Service (GPRS) enhancements for Evolved Universal Terrestrial Radio Access Network (E-UTRAN) access (Release 14), Jun. 2017, pp. 1-386.
(Continued)

*Primary Examiner* — Anh Vu H Ly
(74) *Attorney, Agent, or Firm* — Murphy, Bilak & Homiller, PLLC

(57) ABSTRACT

An exemplary central unit (CU) network node manages resources associated with a radio link serving a UE. The CU network node can configure (1502) distributed unit (DU) network nodes, coupled to the CU network node and the UE, with one or more criteria relating to reporting quality metrics pertaining to the radio link. The CU network node can receive (1504) one or more quality metric reports, from a reporting DU network node, in accordance with the one or more criteria. The CU network node can determine (1506) a change in resources associated with the radio link based on the one or more quality metric reports and information identifying whether the radio link is a single-connectivity link or a multi-connectivity link. Other exemplary embodiments include a DU network node, methods performed by
(Continued)

the CU network node or the DU network node, and computer program products or computer-readable media embodying instructions corresponding to these methods.

19 Claims, 20 Drawing Sheets

(51) Int. Cl.
*H04W 24/10* (2009.01)
*H04W 88/08* (2009.01)

(56) References Cited

U.S. PATENT DOCUMENTS

| | | | |
|---|---|---|---|
| 10,568,007 B2* | 2/2020 | Park | H04W 36/0077 |
| 2016/0219475 A1 | 7/2016 | Kim | |
| 2016/0242226 A1* | 8/2016 | Fushiki | H04W 76/36 |
| 2017/0208516 A1* | 7/2017 | Kubota | H04W 36/08 |
| 2018/0020418 A1* | 1/2018 | Chandramouli | H04W 76/16 |
| 2018/0083688 A1* | 3/2018 | Agiwal | H04M 3/537 |
| 2018/0084539 A1* | 3/2018 | Kubota | H04W 8/24 |
| 2018/0368205 A1* | 12/2018 | Park | H04W 16/28 |
| 2018/0376380 A1* | 12/2018 | Leroux | H04W 36/0011 |
| 2019/0037522 A1* | 1/2019 | Tenny | H04W 36/04 |
| 2019/0059039 A1* | 2/2019 | Centonza | H04W 76/15 |
| 2019/0075552 A1* | 3/2019 | Yu | H04W 48/20 |
| 2019/0166526 A1* | 5/2019 | Xu | H04W 36/08 |
| 2019/0313314 A1* | 10/2019 | Yang | H04W 24/10 |
| 2019/0342800 A1* | 11/2019 | Sirotkin | H04B 17/318 |
| 2019/0380128 A1* | 12/2019 | Park | H04W 72/0433 |
| 2020/0022209 A1* | 1/2020 | Peng | H04W 12/0401 |
| 2020/0029241 A1* | 1/2020 | Maeder | H04W 76/20 |

OTHER PUBLICATIONS

"3GPP TS 23.501 V1.2.0", 3rd Generation Partnership Project; Technical Specification Group Services and System Aspects; System Architecture for the 5G System; Stage 2 (Release 15), Jul. 2017.
"3GPP TS 33.401 V14.3.0", 3rd Generation Partnership Project; Technical Specification Group Services and System Aspects; 3GPP System Architecture Evolution (SAE); Security architecture (Release 14), Jun. 2017, pp. 1-153.
"3GPP TS 36.300 V14.3.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), Jun. 2017, pp. 1-331.
"3GPP TS 37.340 V0.2.1", 3rd Generation Partnership Project; Technical Specification Group Radio Access Network; Evolved Universal Terrestrial Radio Access (E-UTRA) and NR; Multi-connectivity; Stage 2 (Release 15), Aug. 2017, pp. 1-43.
"3GPP TS 38.300 V0.6.0", 3rd Generation Partnership Project; Technical Specification Group Radio Access Network; NR; NR and NG-RAN Overall Description; Stage 2 (Release 15), Aug. 2017, pp. 1-59.
"3GPP TS 38.401 V0.1.0", 3rd Generation Partnership Project; Technical Specification Group Radio Access Network; NG-RAN; Architecture description (Release 15), May 2017, pp. 1-18.
"R3-173235 Mechanism for fast retransmission of lost PDUs", 3GPP TSG-RAN WG3 #97; Berlin, Germany, Aug. 21-25, 2017, Aug. 21-25, 2017, pp. 1-5.
"3GPP TR 36.819 V11.2.0", 3rd Generation Partnership Project; Technical Specification Group Radio Access Network; Coordinated multi-point operation for LTE physical layer aspects (Release 11), Sep. 2013, pp. 1-70.
"3rd Generation Partnership Project; Technical Specification Group Radio Access Network; Study on Small Cell enhancements for E-UTRA and E-UTRAN; Higher layer aspects (Release 12)", 3GPP TR 36.842 V12.0.0, Dec. 2013, pp. 1-71.
Lee, D., et al., "Coordinated Multipoint Transmission and Reception in LTE-Advanced: Deployment Scenarios and Operational Challenges", Lee, D. et al. "Coordinated Multipoint Transmission and Reception in LTE-Advanced: Deployment Scenarios and Operational Challenges." IEEE Communications Magazine, LTE-Advanced and 4G Wireless Communications, Feb. 2012, pp. 148-155, vol. 50, Issue 2.
"3GPP TR 36.932 V14.0.0 (Mar. 2017)", 3rd Generation Partnership Project; Technical Specification Group Radio Access Network; Scenarios and requirements for small cell enhancements for E-UTRA and E-UTRAN (Release 14), Mar. 2017, pp. 1-14.

* cited by examiner

1500

CONFIGURE ONE OR MORE DISTRIBUTED UNIT (DU) NETWORK NODES, COUPLED TO THE CU NETWORK NODE AND THE UE, WITH ONE OR MORE CRITERIA RELATING TO REPORTING QUALITY METRICS PERTAINING TO THE RADIO LINK
1502

RECEIVE ONE OR MORE QUALITY METRIC REPORTS, FROM A REPORTING DU NETWORK NODE OF THE DU NETWORK NODES, IN ACCORDANCE WITH THE ONE OR MORE CRITERIA
1504

DETERMINE A CHANGE IN RESOURCES ASSOCIATED WITH THE RADIO LINK SERVING THE UE BASED ON THE ONE OR MORE QUALITY METRIC REPORTS AND INFORMATION IDENTIFYING WHETHER THE RADIO LINK IS A SINGLE-CONNECTIVITY LINK OR A MULTI-CONNECTIVITY LINK
1506

*FIG. 15*

RADIO LINK MANAGEMENT IN A SPLIT RAN ARCHITECTURE

TECHNICAL FIELD

The present disclosure generally relates to the field of wireless network communications, and more particularly, to operating a central unit (CU) network node and distributed unit (DU) network nodes to manage resources associated with a radio link serving a user equipment (UE).

BACKGROUND

Evolved Packet System (EPS) is the Evolved 3GPP Packet Switched Domain and includes Evolved Packet Core (EPC) and Evolved Universal Terrestrial Radio Access Network (E-UTRAN).

The EPC architecture is defined in 3GPP TS 23.401, which provides definitions of the PGW (PDN Gateway), SGW (Serving Gateway), PCRF (Policy and Charging Rules Function), MME (Mobility Management Entity), and mobile device (User Equipment, UE). The Long-Term Evolution (LTE) radio access, E-UTRAN, includes one more eNBs (also referred to as base stations). FIG. 1 illustrates non-roaming EPC architecture for 3GPP accesses.

FIG. 2 illustrates an overall E-UTRAN architecture and is further defined, for example, in 3GPP TS 36.300. The E-UTRAN includes eNBs, providing the E-UTRA user plane (PDCP/RLC/MAC/PHY or Packet Data Convergence Protocol/Radio Link Control/Medium Access Control/Physical Layer) and control plane (Radio Resource Control, or RRC) protocol terminations towards the UE. The eNBs are interconnected with each other by means of the X2 interface. The eNBs are also connected by means of the S1 interface to the EPC (Evolved Packet Core), more specifically to the MME (Mobility Management Entity) by means of the S1-MME interface and to the Serving Gateway (S-GW) by means of the S1-U interface.

Portions of the EPC Control Plane (CP) and User Plane (UP) architectures are shown in FIGS. 3 and 4. FIG. 3 illustrates the EPC Control Plane protocol architecture, and FIG. 4 illustrates the EPC User Plane protocol architecture.

LTE Dual Connectivity (DC) is standardized in 3GPP Rel-12 to enable UEs to send and receive data on multiple carriers at the same time (e.g., multiple TX/RX). As described in 3GPP TS 36.300, E-UTRAN supports DC operation whereby a multiple Rx/Tx UE in RRC_CONNECTED is configured to utilize radio resources provided by two distinct schedulers, located in two eNBs connected via a non-ideal backhaul over the X2 interface (see 3GPP TRs 36.842 and 36.932). The overall E-UTRAN architecture depicted in FIG. 2 is applicable for DC as well. eNBs involved in DC for a certain UE may assume two different roles: an eNB may either act as an MeNB (Master eNB) or as an SeNB (Secondary eNB). In DC, a UE is connected to one MeNB and one SeNB.

In DC, the radio protocol architecture that a particular bearer uses depends on how the bearer is setup. Three bearer types are MCG (Master Cell Group) bearer, SCG (Secondary Cell Group) bearer, and split bearer. Those three bearer types are shown in FIG. 5, which illustrates Radio Protocol Architecture for Dual Connectivity. RRC is managed in a MeNB, and SRBs (Signaling Radio Bearers) are always configured as MCG bearer type and therefore only use the radio resources of the MeNB. Note that DC can also be described as having at least one bearer configured to use radio resources provided by the SeNB.

Inter-eNB control plane signaling for DC is performed by means of X2 interface signaling. Control plane signaling towards the MME is performed by means of S1 interface signaling. There is only one S1-MME connection per DC UE between the MeNB and the MME. Each eNB should be able to handle UEs independently, i.e., provide the PCell to some UEs while providing SCell(s) for SCG to others. Each eNB involved in DC for a certain UE controls its radio resources and is primarily responsible for allocating radio resources of its cells. Respective coordination between MeNB and SeNB is performed by means of X2 interface signaling. FIG. 6 illustrates CP connectivity of eNBs involved in DC for a particular UE. The S1-MME is terminated in MeNB, and the MeNB and the SeNB are interconnected via X2-C.

For DC, two different user plane architectures are allowed: one in which the S1-U only terminates in the MeNB and the user plane data is transferred from MeNB to SeNB using the X2-U; and a second architecture where the S1-U can terminate in the SeNB. FIG. 7 illustrates different UP connectivity options of eNBs involved in DC for a certain UE. Different bearer options can be configured with different user plane architectures. UP connectivity depends on the bearer option configured.

For MCG bearers, the S1-U connection for the corresponding bearer(s) to the S-GW is terminated in the MeNB. The SeNB is not involved in the transport of user plane data for this type of bearer(s) over the Uu. For split bearers, the S1-U connection to the S-GW is terminated in the MeNB. PDCP data is transferred between the MeNB and the SeNB via X2-U. The SeNB and MeNB are involved in transmitting data of this bearer type over the Uu. For SCG bearers, the SeNB is directly connected with the S-GW via S1-U. The MeNB is not involved in the transport of user plane data for this type of bearer over the Uu. Note that if only MCG and split bearers are configured, there is no S1-U termination in the SeNB.

The SeNB Addition procedure is initiated by the MeNB and is used to establish a UE context at the SeNB in order to provide radio resources from the SeNB to the UE. This procedure is used to add at least the first cell (PSCell) of the SCG. FIG. 8 shows this SeNB Addition procedure.

Multi-connectivity can also be envisioned as an important feature for fifth-generation (5G) RAN architectures standardized by 3GPP. FIG. 9 illustrates a high-level view of the 5G network architecture, consisting of a Next Generation RAN (NG-RAN) and a 5G Core (5GC). The NG-RAN can comprise a set of gNodeB's (gNBs) connected to the 5GC via one or more NG interfaces, whereas the gNBs can be connected to each other via one or more Xn interfaces. Each of the gNBs can support frequency division duplexing (FDD), time division duplexing (TDD), or a combination thereof.

The 5G RAN logical nodes shown in FIG. 9 (and described in TR38.801 v1.2.0) include a Central Unit (CU) and one or more Distributed Units (DU). The CU is a logical node that is a centralized unit that hosts high layer protocols and includes a number of gNB functions, including controlling the operation of DUs. A DU is a decentralized logical node that hosts lower layer protocols and can include, depending on the functional split option, various subsets of the gNB functions. As used herein, the terms "central unit" and "centralized unit" are used interchangeably, and the terms "distributed unit" and "decentralized unit" are used interchangeably.

A CU may host protocols such as RRC and PDCP, while a DU may host protocols such as RLC, MAC and PHY.

Other variants of protocol distributions between CU and DU exist, such as hosting the RRC, PDCP and part of the RLC protocol in the CU (e.g., Automatic Retransmission Request (ARQ) function), while hosting the remaining parts of the RLC protocol in the DU, together with MAC and PHY. In some exemplary embodiments, the CU is assumed to host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

In the architecture identified by CUs and DUs, DC can be achieved by means of allowing a UE to connect to multiple DUs served by the same CU or by allowing a UE to connect to multiple DUs served by different CUs.

As illustrated in FIG. 9, a gNB can include a gNB-CU connected to one or more gNB-DUs via respective F1 interfaces, all of which are described hereinafter in greater detail. In the NG-RAN architecture, however, a gNB-DU can be connected to only a single gNB-CU.

The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In NG-Flex configuration, each gNB is connected to all 5GC nodes within a pool area. The pool area is defined in 3GPP TS 23.501. If security protection for control plane and user plane data on TNL of NG-RAN interfaces has to be supported, NDS/IP (3GPP TS 33.401) shall be applied.

3GPP Tdoc R3-173235 discloses mechanisms to achieve fast retransmission of lost Protocol Data Units (PDUs) in case of radio link outage. R3-173235 focuses on the case where a DU communicates to the CU via an F1 interface, i.e., within a single gNB. Further, the document focuses on the case where a radio blockage event occurs for a limited amount of time, after which the radio link is back to good radio quality. The document mentions a possible case where the radio link in question becomes unstable, however no solutions are described to address this case.

As mentioned above, multi-connectivity (e.g., DC) is envisioned as an important feature to be supported in RAN 5G architectures. In this context, DC support includes establishing master (MN) and secondary nodes (SNs) and distributing UP traffic to the MN and SNs according to optimal, preferred, and/or desirable traffic and radio resource management techniques. CP traffic is assumed to terminate in one node only, i.e. the MN. FIGS. 10 and 11 show the protocol and interfaces involved in DC, as described in 3GPP TS 38.300v0.6.0. FIG. 10 shows that the Master gNB (MgNB) can forward PDCP bearer traffic to a Secondary gNB (SgNB), while FIG. 11 shows the case where the SgNB can forward PDCP bearer traffic to the MgNB. In some exemplary embodiments, the MgNB and/or SgNB can be subject to the RAN split architecture (e.g., CU and DU) discussed above.

Furthermore, multi-RAT dual connectivity (MR-DC) can also be envisioned as an important feature in 5G RAN architectures. When MR-DC is applied, the MN can anchor the control plane towards the CN, while the SN can provide control and user plane resources to the UE via coordination with the MN. This is illustrated in FIG. 12, which is extracted from 3GPP TS 37.340. Within the scope of MR-DC, various user plane/bearer type solutions are possible, as seen in FIG. 13, also from TS 37.340.

Due to variable radio channel quality between a UE and an eNB (4G) or a gNB (5G), interruptions or blockages in the data throughput over the radio link can occur. Removing a blocked radio link frees resources that can be used to server other UEs or users. The removal decision must also take into account the likelihood that the blocked radio link will return to normal performance within a short time window. If this occurs, a maintained link could be reused without the need to set it up again from scratch, which also saves resources.

SUMMARY

Exemplary embodiments of the present disclosure include a method of operating a CU network node to manage resources associated with a radio link serving a UE. The method includes configuring one or more DU network nodes, coupled to the CU network node and the UE, with one or more criteria relating to reporting quality metrics pertaining to the radio link and receiving one or more quality metric reports, from a reporting DU network node of the one or more DU network nodes, in accordance with the one or more criteria. The method includes determining a change in resources associated with the radio link serving the UE based on the one or more quality metric reports and information identifying whether the radio link is a single-connectivity link or a multi-connectivity link.

Other exemplary embodiments of the present disclosure include a method of operating a DU network node for managing resources associated with a radio link serving a UE. The method includes receiving, from a CU network node coupled to the DU network node, one or more criteria relating to reporting quality metrics pertaining to the radio link. The method also includes transmitting one or more quality metric reports to the CU network node in accordance with the one or more criteria and receiving one or more instructions, from the CU network node, for changing resources associated with the radio link serving the UE based on the one or more quality metric reports and information identifying whether the radio link is a single-connectivity link or a multi-connectivity link.

According to some embodiments, a method of operating a DU network node for managing resources associated with a radio link serving a UE includes receiving, from a CU network node coupled to the DU network node, an indication of whether the radio link is a single-connectivity link or a multi-connectivity link. The method also includes measuring one or more quality metrics pertaining to the radio link in accordance with the one or more criteria received from an external source and determining a change in resources associated with the radio link serving the UE based on the measured one or more quality metrics and the indication identifying whether the radio link is a single-connectivity link or a multi-connectivity link.

According to some embodiments, a method of operating a CU network node to manage resources associated with a radio link serving a UE includes configuring one or more DU network nodes, coupled to the CU network node and the UE, with one or more criteria relating to measuring quality metrics pertaining to the radio link. The method also includes sending, to the one or more DU network nodes, an indication of whether the radio link is a single-connectivity link or a multi-connectivity link. The method further includes receiving one or more messages, from a reporting DU network node of the one or more DU network nodes, indicating a change in resources associated with the radio link in accordance with the one or more criteria and based on the received one or more messages, performing a resource management action with respect to the radio link.

According to some embodiments, a CU network node for a radio access network includes communication interface circuitry configured to communicate with one or more DU network nodes and processing circuitry operatively associated with the communication interface circuitry. The processing circuitry can be configured to configure the at one or more DU network nodes with one or more criteria relating to reporting quality metrics pertaining to a radio link serving a UE. The processing circuitry can also be configured to receive one or more quality metric reports, from a reporting DU network node of the one or more DU network nodes, in accordance with the one or more criteria. The processing circuitry can also be configured to determine a change in resources associated with the radio link serving the UE based on the one or more quality metric reports and information identifying whether the radio link is a single-connectivity link or a multi-connectivity link.

According to some embodiments, a DU network node for a radio access network includes communication interface circuitry configured to communicate with a CU network node, transceiver circuitry configured for communicating with a UE, and processing circuitry operatively associated with the communication interface circuitry and the transceiver circuitry. The processing circuitry can be configured to receive, from the CU network node, one or more criteria relating to reporting quality metrics pertaining to a radio link serving the UE. The processing circuitry can also be configured to transmit one or more quality metric reports to the CU network node in accordance with the one or more criteria and receive one or more instructions, from the CU network node, for changing resources associated with the radio link serving the UE based on the one or more quality metric reports and information identifying whether the radio link is a single-connectivity link or a multi-connectivity link.

According to some embodiments, a CU network node, operable to manage resources associated with a radio link serving a UE, can be adapted to configure one or more DU network nodes, coupled to the CU network node and the UE, with one or more criteria relating to reporting quality metrics pertaining to the radio link. The CU network node can also be adapted to receive one or more quality metric reports, from a reporting DU network node of the one or more DU network nodes, in accordance with the one or more criteria. The CU network node can also be adapted to determine a change in resources associated with the radio link serving the UE based on the one or more quality metric reports and information identifying whether the radio link is a single-connectivity link or a multi-connectivity link.

According to some embodiments, a DU network node, operable to manage resources associated with a radio link serving a UE, can be adapted to receive, from a CU network node coupled to the DU network node, one or more criteria relating to reporting quality metrics pertaining to the radio link. The DU network node can also be adapted to transmit one or more quality metric reports to the CU network node in accordance with the one or more criteria. The DU network node can also be adapted to receive one or more instructions, from the CU network node, for changing resources associated with the radio link serving the UE based on the one or more quality metric reports and information identifying whether the radio link is a single-connectivity link or a multi-connectivity link.

According to some embodiments, a DU network node configured to manage resources associated with a radio link serving a UE includes communication interface circuitry configured to communicate with a CU network node, transceiver circuitry configured for communicating with the UE and processing circuitry operatively associated with the communication interface circuitry and the transceiver circuitry. The processing circuitry can be configured to receive, from the CU network node coupled to the DU network node, an indication of whether the radio link is a single-connectivity link or a multi-connectivity link, and measure one or more quality metrics pertaining to the radio link in accordance with the one or more criteria received from an external source. The processing circuitry can also be configured to determine a change in resources associated with the radio link serving the UE based on the measured one or more quality metrics and the information identifying whether the radio link is a single-connectivity link or a multi-connectivity link.

According to some embodiments, a CU network node configured to manage resources associated with a radio link serving a UE includes communication interface circuitry configured to communicate with one or more DU network nodes and processing circuitry operatively associated with the communication interface circuitry. The processing circuitry can be configured to configure the one or more DU network nodes, coupled to the CU network node and the UE, with one or more criteria relating to measuring quality metrics pertaining to the radio link. The processing circuitry can also be configured to send, to the one or more DU network nodes, an indication of whether the radio link is a single-connectivity link or a multi-connectivity link. The processing circuitry can be configured to receive one or more messages, from a reporting DU network node of the one or more DU network nodes, indicating a change in resources associated with the radio link in accordance with the one or more criteria, and, based on the received one or more messages, perform a resource management action with respect to the radio link.

Further aspects of the present invention are directed to computer program products or computer readable storage medium corresponding to the methods summarized above.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 15 illustrates a flow diagram of a method by the CU network node for managing resources associated with a radio link serving a UE, according to some embodiments.

DETAILED DESCRIPTION

Figure 1:
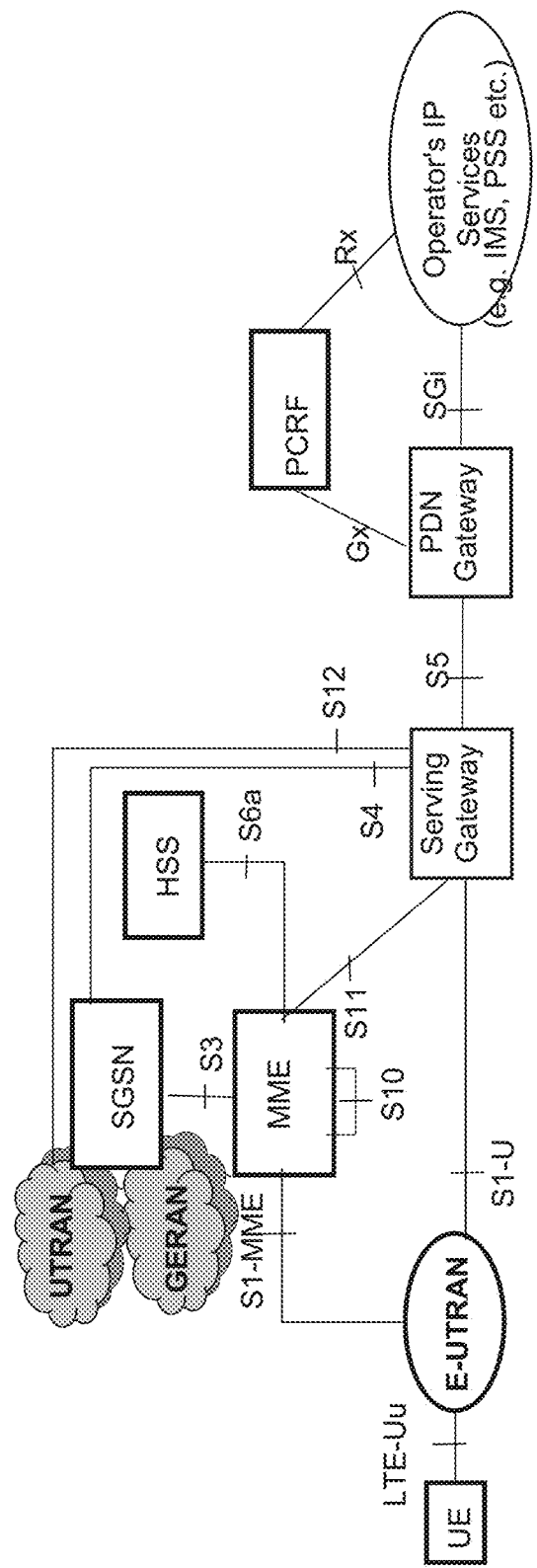
FIG. 1 illustrates non-roaming EPC architecture for 3GPP accesses.
Figure 2:
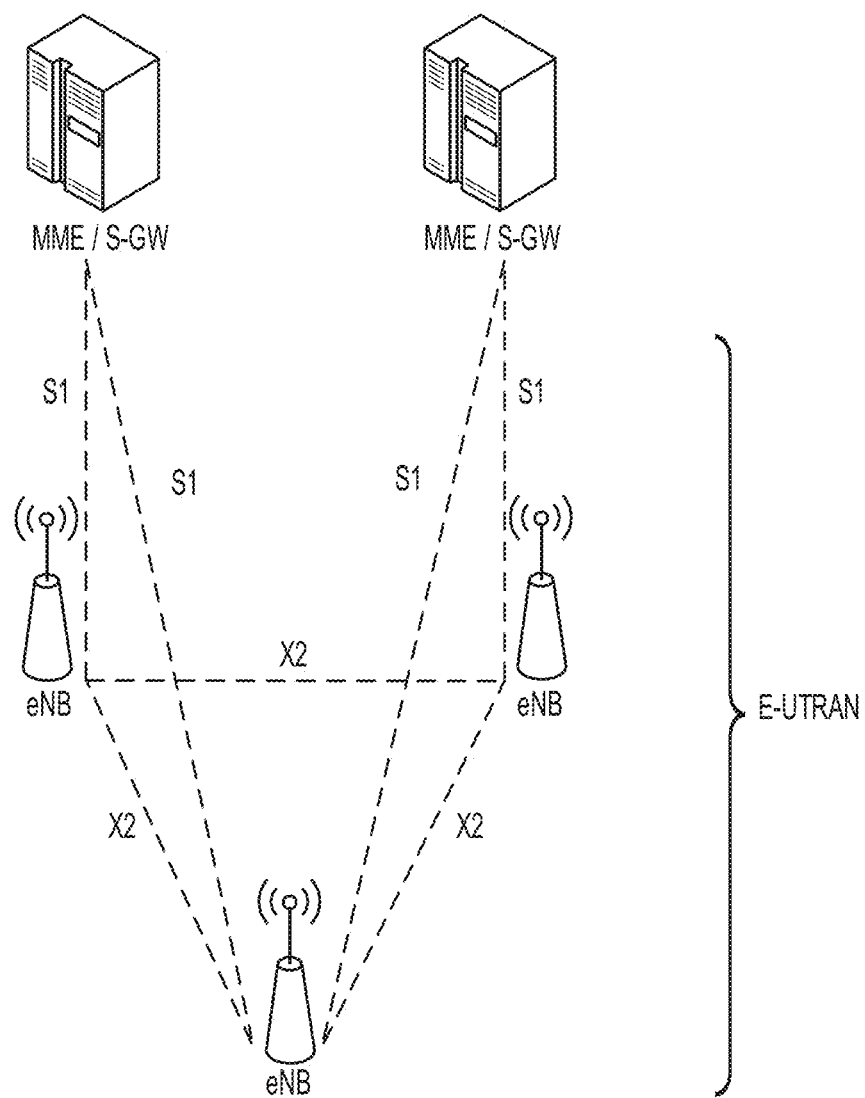
FIG. 2 illustrates an overall E-UTRAN architecture.
Figure 3:
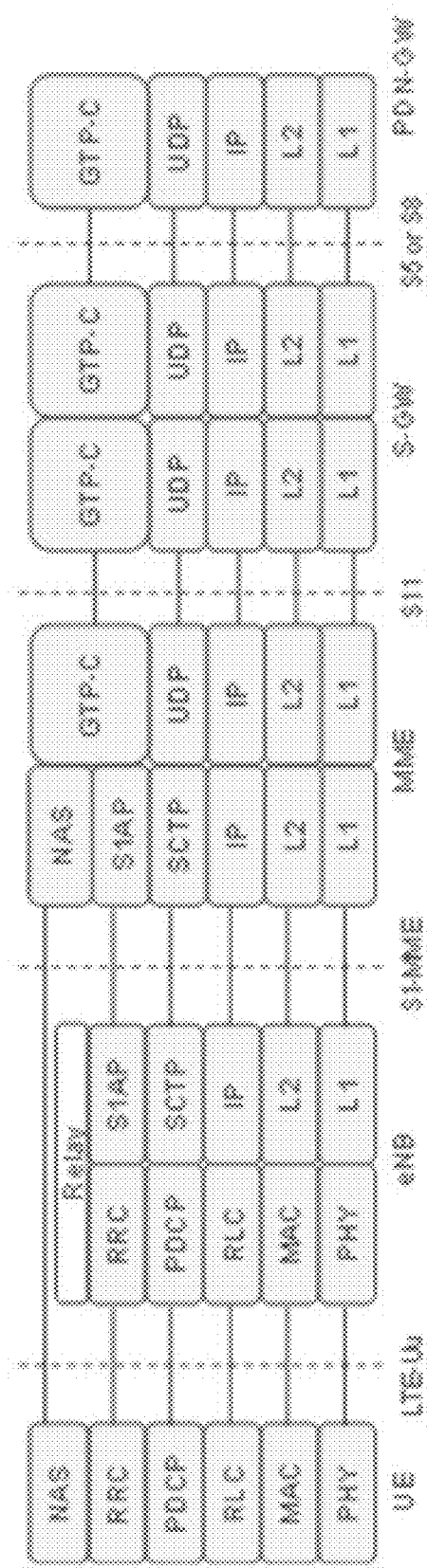
FIG. 3 illustrates the EPC Control Plane protocol architecture.
Figure 4:
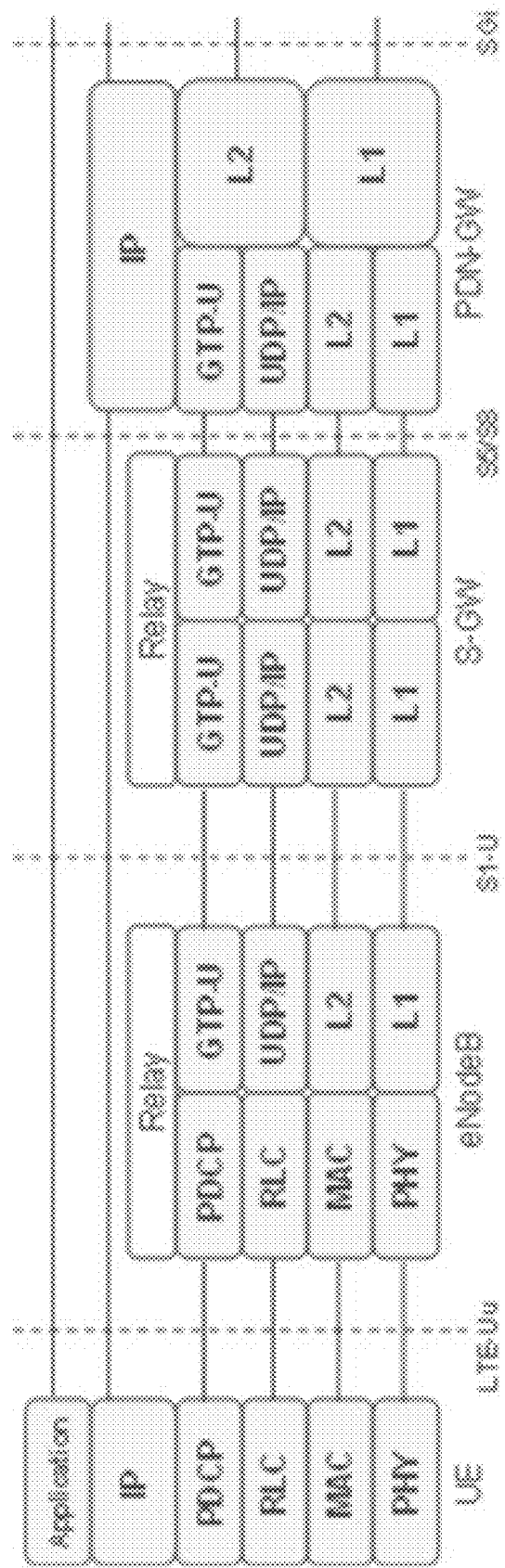
FIG. 4 illustrates the EPC User Plane protocol architecture.
Figure 5:
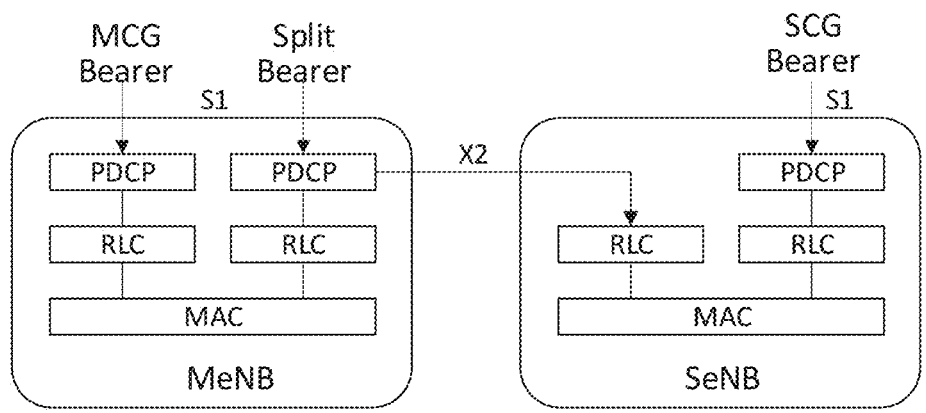
FIG. 5 illustrates Radio Protocol architecture for Dual Connectivity (DC).
Figure 6:
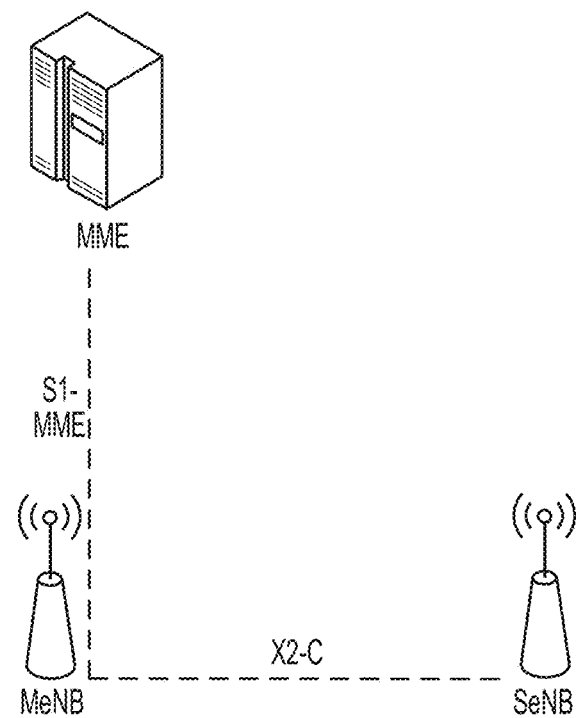
FIG. 6 illustrates CP connectivity of eNBs involved in DC.
Figure 7:
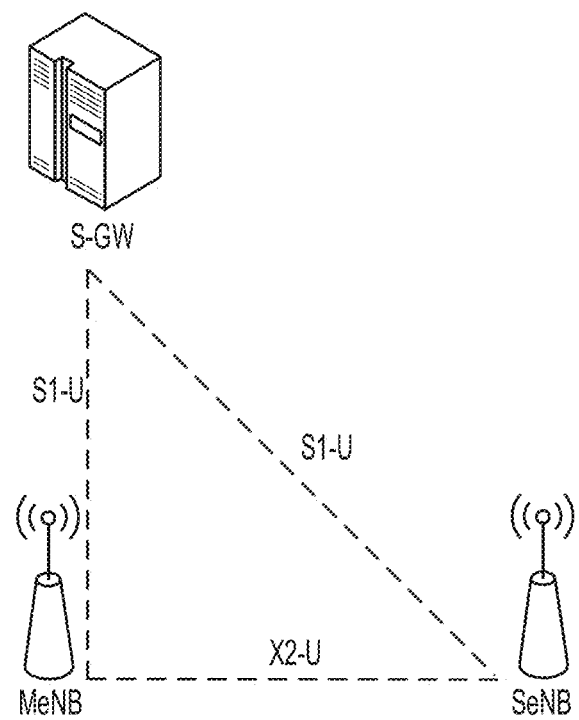
FIG. 7 illustrates different UP connectivity options of eNBs involved in DC.
Figure 9:
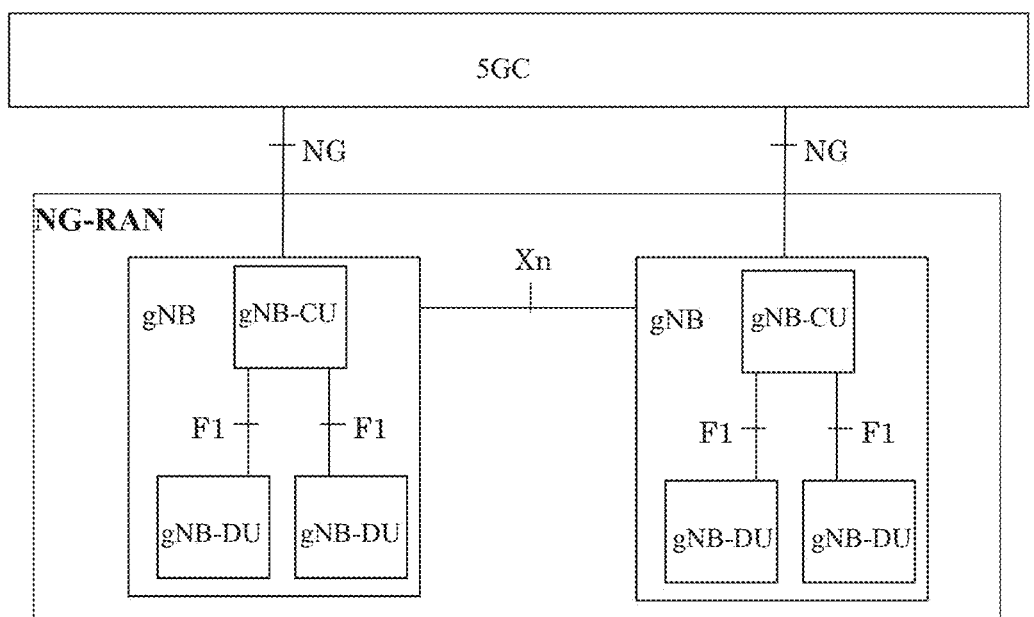
FIG. 9 illustrates a high-level view of the 5G network architecture.
Figure 8:
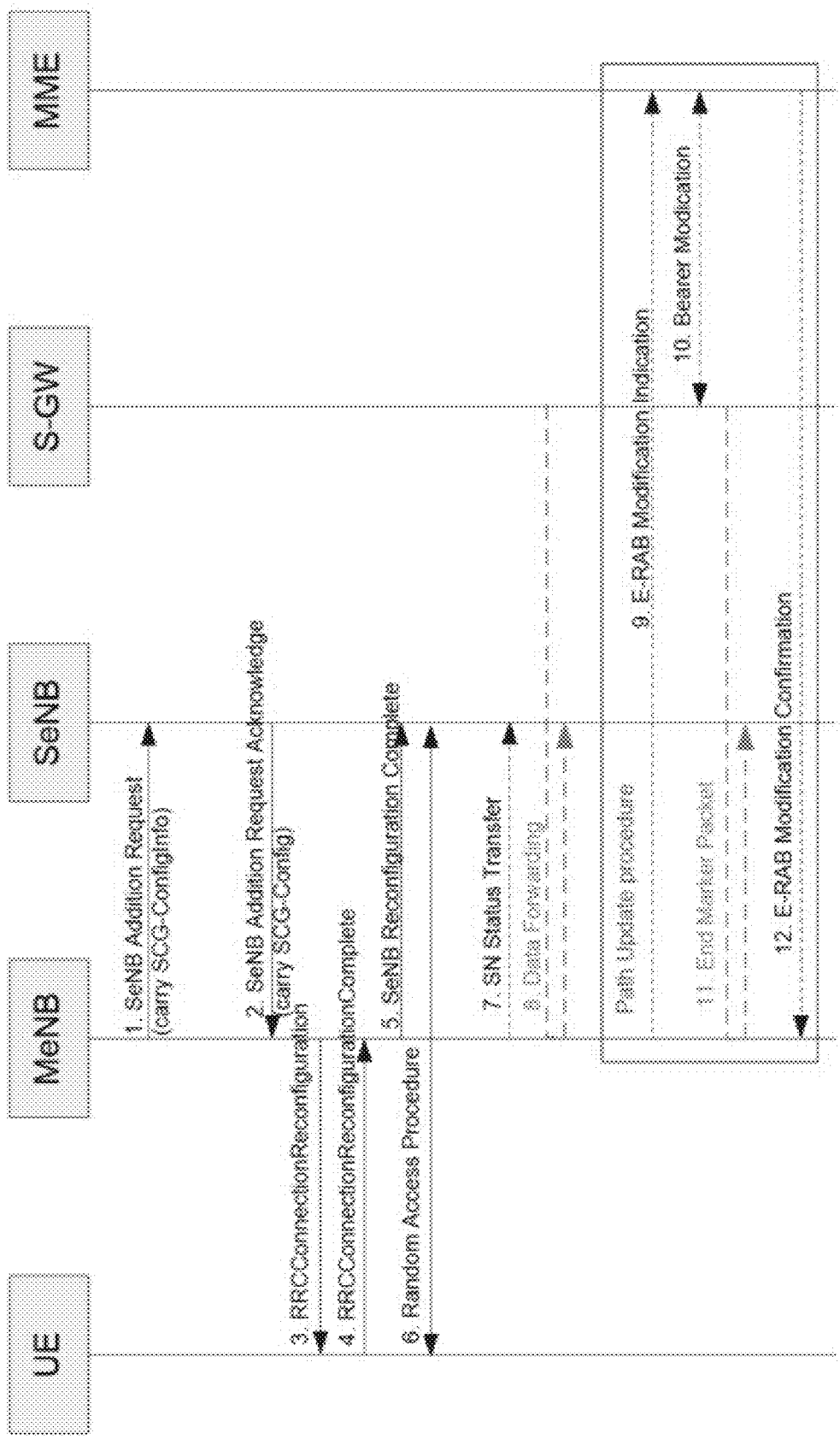
FIG. 8 illustrates an SeNB Addition procedure.
Figure 10:
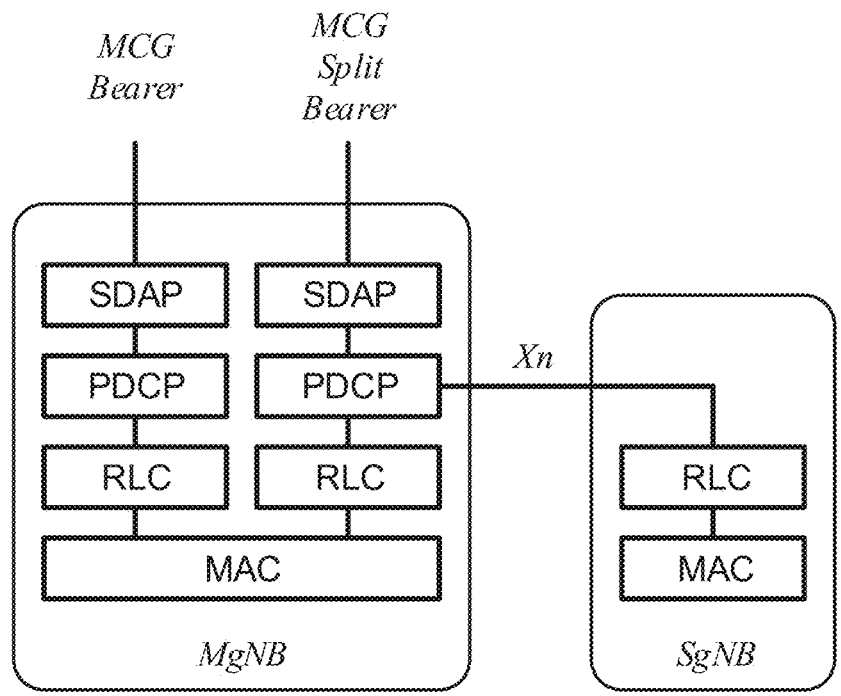
FIG. 10 illustrates a Master gNB (MgNB) that can forward PDCP bearer traffic to a Secondary gNB (SgNB).
Figure 11:
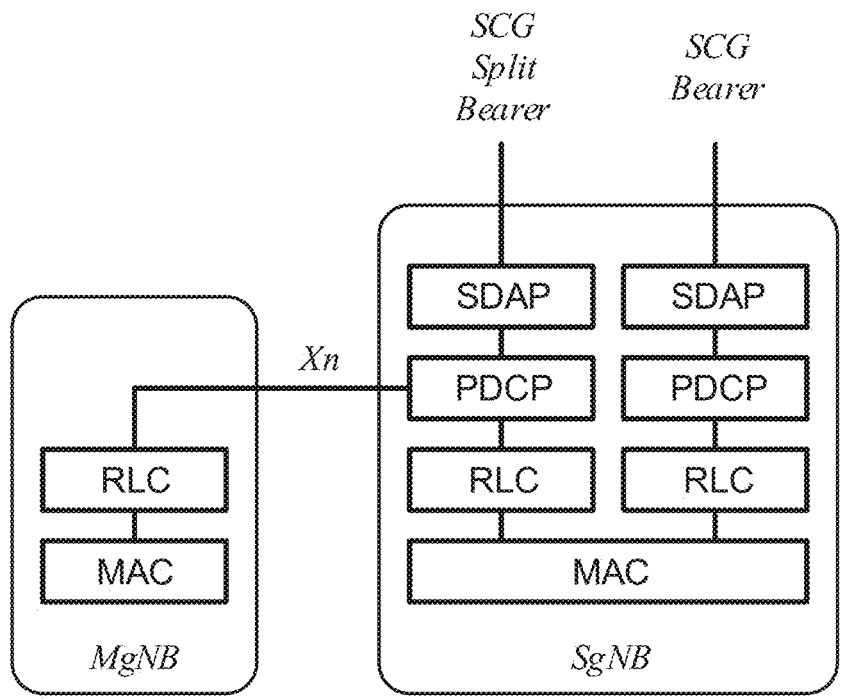
FIG. 11 illustrates the case where the SgNB forwards PDCP bearer traffic to the MgNB.
Figure 12:
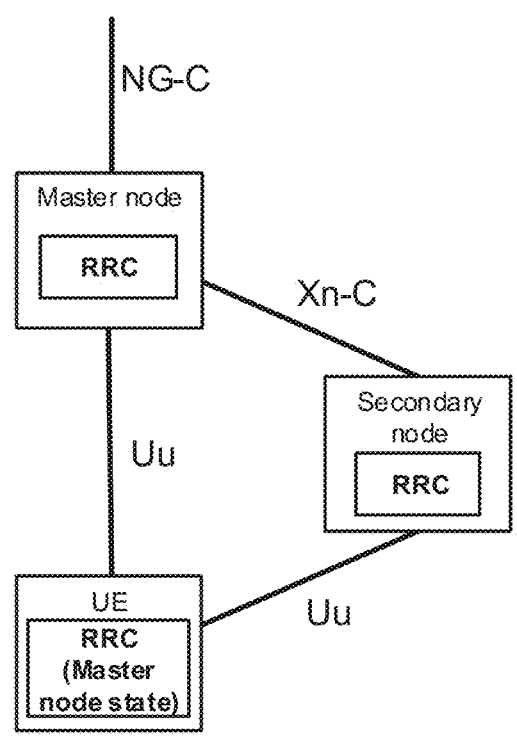
FIG. 12 illustrates principles of MR-DC in 5G.
Figure 13:
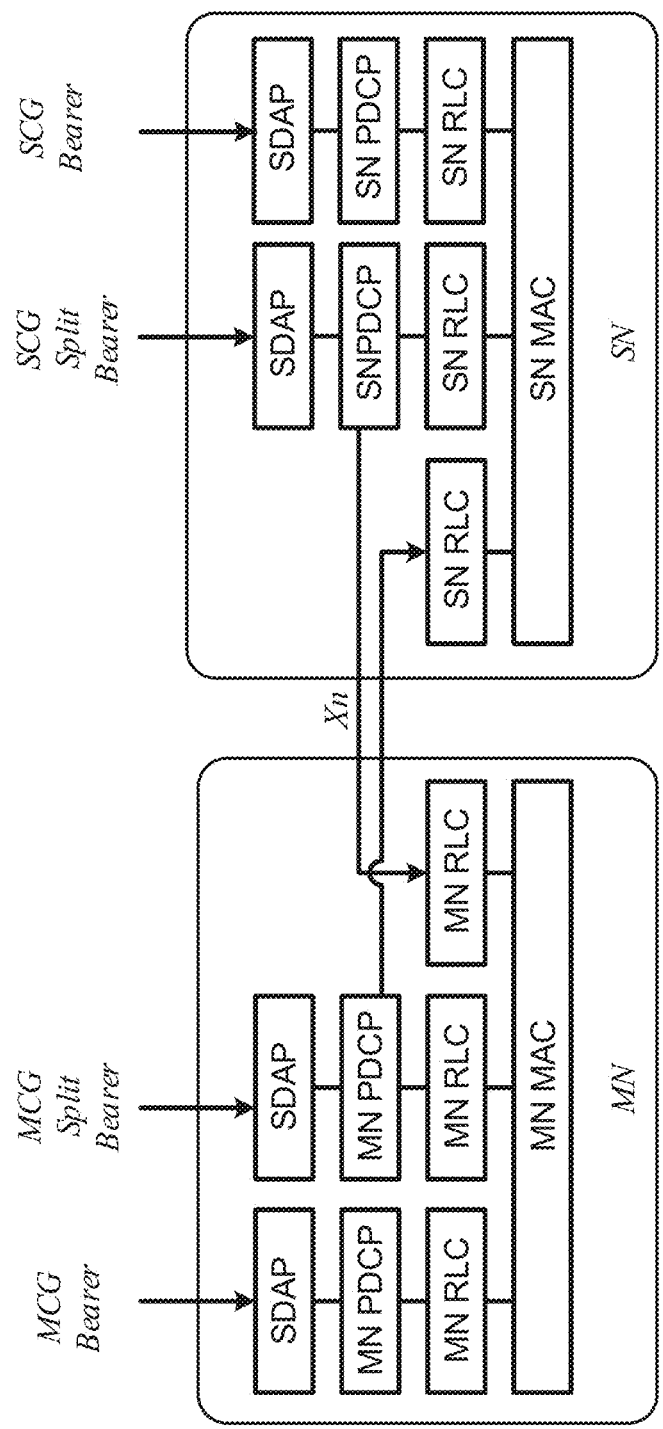
FIG. 13 illustrates an architecture in MR-DC with 5GC.

Exemplary embodiments of the present disclosure will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment can be tacitly assumed to be present/used in another embodiment.

In the case of multi-connectivity links, such as DC links, a gNB-DU providing a particular radio link to a UE may lack knowledge of whether the radio link is part of a multi-connectivity configuration or the only radio link serving the UE. As such, the gNB-DU is unable to make an informed decision to remove or other change the resources associated with the radio link. This risks removing the only means for the UE to exchange data traffic with the network. At the same time, however, failing to remove a blocked radio link that is part of a multi-connectivity link—which can include other radio links that are not blocked—ties up limited resources that are unavailable to other users of the network. Accordingly, it is recognized herein that there is a need for solutions that allow the RAN to make reliable decisions on whether a radio link can be removed or not.

Embodiments described herein can enable the RAN to make reliable decisions on whether a radio link serving a UE should be suspended or removed. In some exemplary embodiments, the UE can be connected via a radio link served by a specific DU. The DU can monitor the performance of the radio link and can assess whether the link has degraded to the point that a radio link removal is necessary. In this example, the DU has previously been informed of whether the radio link is established for single connectivity or for multi-connectivity (e.g., dual connectivity). Such information can be given to the DU on a per radio bearer level. The DU is therefore able to decide whether the radio link should be removed, and on the basis of this, the DU may send a message to the CU to which it is connected, via an F1 interface, or to CUs belonging to other RAN nodes via an Xn interface. The signaling over the F1 and Xn (or X2) interfaces can be done using control plane (i.e., over F1-C and/or Xn-C and/or X2-C) or in-band using user plane (i.e., over F1-U and/or Xn-U and/or X2-U). In this first example, the CU receiving the message may take action to remove the radio link and configure the UE accordingly.

In other exemplary embodiments, the UE can be connected via a radio link served by a specific DU. The DU can monitor the performance of the radio link and can assess the level of degradation of a radio link. For example, the DU can classify whether the radio link is subject to temporary outages that may not require radio link removal (e.g. because after a short outage the link goes back to good quality) or whether the link is subject to quality degradation that makes it not efficient to maintain the link active and that requires a radio link removal. In this example, the CU to which the DU is connected (via the F1 interface) requests the DU to report back different types of events.

One exemplary event is a temporary radio link outage with subsequent radio link quality recovery. Eventually, a time duration of the outage can be reported by the DU to the CU. An outage can be, for example, a radio link quality drop affecting traffic transmission, a radio link blockage event during which no traffic can be exchanged via the link, or a drop in radio quality that makes the radio link very inefficient from the point of view of traffic transmitted versus resources used. The criteria for the event reporting can be configured by the CU. Another type of event is a critical radio link outage by which the radio link quality is degraded for a period of time considered long enough to require a decision on whether to remove the link or not.

While dual connectivity and 5G architecture are used to describe exemplary embodiments herein, the methods are meant to cover other cases of multi-connectivity, such as scenarios where the UE has multiple radio links served potentially by different DUs and gNBs. The methods can also be applicable to LTE technologies or to scenarios where 5G and LTE are used together.

Some of the embodiments include a DU network node in a gNB of the NG-RAN sending a request to a CU network node of the gNB for removal of a radio link to the CU network node. The DU network node may inform the CU network node of conditions of a radio link that can be used by the CU network node to trigger the removal of the radio link. In some embodiments, the CU network node informs the DU network node on whether an UE is using dual connectivity or on whether a dedicated radio bearer (DRB) of an UE is using dual connectivity.

In some exemplary embodiments, any changes to the radio link resources, such as a removal decision, are made at the CU network node. In this example, the DU network node can be configured with criteria according to which a radio link is: of good or poor quality; a temporary outage not requiring radio link removal; in critical outage requiring radio link removal; or recovered from performance drop and ready to be used for traffic exchange. Such criteria can be configured at the DU network node via the Operation and Management System (OMS) or can be configured by the CU network node that is connected to the DU network node, via F1 interface signaling.

With this information, the DU network node receives instructions on how to report pre-configured events. Such events can be of several types. One type includes reporting on an event based level of temporary outages, where a temporary outage is fulfilled when preconfigured conditions are satisfied (e.g., radio blockage duration, throughput below a given threshold and similar). Another type includes reporting on an event based level of critical outages, where a critical outage is fulfilled when preconfigured conditions are satisfied (e.g., radio blockage duration, throughput below a given threshold and similar).

This can include the periodic reporting of radio link status. Such reporting can include reporting on a periodic basis of whether the radio link is in normal operation, in temporary outage or in critical outage. The reporting can include specific parameters describing the status of the radio link, such as Block Error Rate, Throughput, Signal to Noise Ratio, Channel Coding, and other parameters able to describe the quality of the radio link. It is worth noting that in this example, the DU network node has no information about whether the radio link in question is used in single or dual/multi connectivity.

The DU network node may receive from the F1-connected CU network node instructions about which event-reporting mechanism to enable. Alternatively, such instructions can be originated by a CU network node residing in a different gNB and send via an interface like the Xn. The DU network node would receive the information either via its own F1-connected CU network node or directly via the Xn or equivalent interface, in case such interface can terminate at the DU network node.

Once the event reporting mechanism can be configured and activated at the DU network node, the CU network node that provided instructions corresponding to the event reporting can receive messages indicating occurrence of the events configured. The CU network node can make decisions on whether, depending on the reported events, the radio link should be removed or not. Such removal may occur via F1 signaling towards the DU network node via an F1 message indicating removal of one or more DRBs or it may occur via signaling over an interface like the Xn. The latter signaling would indicate removal of bearers established during dual connectivity in a neighbor gNB or it may indicate removal of the secondary node altogether.

Figure 14:
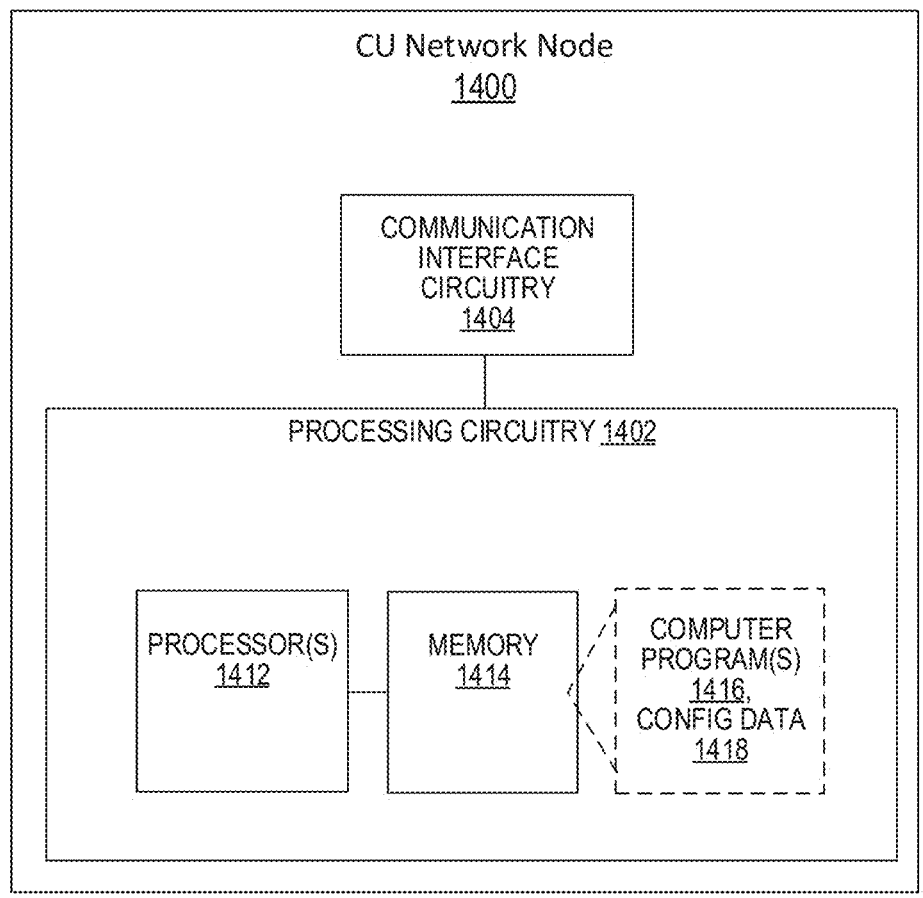
FIG. 14 is a block diagram of a CU network node, according to some embodiments.

FIG. 14 is a block diagram illustrating an exemplary CU network node 1400 that can be configured to make such radio link resource decisions. The CU network node 1400 can be configured to operate as part of a gNB in an NG-RAN. The CU network node 1400 includes communication interface circuitry 1404. The communication interface circuitry 1404 can be configured for communication with other network nodes/devices such as a plurality of DU network nodes.

Exemplary CU network node 1400 includes processing circuitry 1402 that is operatively associated with the communication interface circuitry 1404. The processing circuitry 1402 can comprise one or more digital processors 1412, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. The processors 1412 can be multi-core. More generally, the processing circuitry 1402 can comprise fixed circuitry, or programmable circuitry that is specially configured via the execution of program instructions implementing the functionality taught herein, or can comprise some combination of fixed and programmed circuitry.

The processing circuitry 1402 can also include a memory 1414 that, in some exemplary embodiments, stores one or more computer programs 1416 and, optionally, configuration data 1418. The memory 1414 can provide non-transitory storage for the computer program 1416 and it can comprise one or more types of computer-readable media, such as disk storage, solid-state memory storage, or any mix thereof. By way of non-limiting example, the memory 1414 can comprise any one or more of SRAM, DRAM, EEPROM, and FLASH memory, which can be in the processing circuitry 1402 and/or separate from the processing circuitry 1402. Here, "non-transitory" means permanent, semi-permanent, or at least temporarily persistent storage and encompasses both long-term storage in non-volatile memory and storage in working memory, e.g., for program execution.

The processor 1412 of the processing circuit 1402 can execute a computer program 1416 stored in the memory 1414 that can configure the processor 1412 to act as a CU network node that manages resources associated with a radio link serving a UE. The processing circuitry 1402 can be operable to configure at least one DU network node, coupled to the CU network node and the UE, with one or more criteria relating to reporting quality metrics pertaining to the radio link. The processing circuitry 1402 can also be configured to receive one or more quality metric reports, from a reporting DU network node of the one or more DU network nodes, in accordance with the one or more criteria. The processing circuitry 1402 can be configured to determine a change in resources associated with the radio link serving the UE based on the one or more quality metric reports and information identifying whether the radio link is a single-connectivity link or a multi-connectivity link.

When comprising or associated with a CU network node, the processing circuitry can be configured to perform an exemplary method and/or procedure 1500, illustrated in FIG. 15, for managing resources associated with a radio link serving the UE. Although the exemplary method and/or procedure is illustrated in FIG. 15 by blocks in a particular order, this order is exemplary and the functions corresponding to the blocks can be performed in different orders, and can be combined and/or divided into blocks having different functionality than shown in FIG. 15. Furthermore, exemplary method and/or procedure 1500 can be complimentary to exemplary method and/or procedure 1800 described below. In other words, exemplary methods and/or procedures 1500 and 1800 are capable of being used together for managing resources associated with a radio link serving a UE.

Exemplary method and/or procedure 1500 can include configuring at least one DU network node, coupled to the CU network node and the UE, with one or more criteria relating to reporting quality metrics pertaining to the radio link (block 1502) and receiving one or more quality metric reports, from a reporting DU network node of the one or more DU network nodes, in accordance with the one or more criteria (block 1504). The exemplary method and/or procedure 1500 also includes determining a change in resources associated with the radio link serving the UE based on the one or more quality metric reports and information identifying whether the radio link is a single-connectivity link or a multi-connectivity link (block 1506).

The CU network node and the one or more DU network nodes can be logically associated with a first gNB. In some cases, the one or more DU network nodes can comprise a plurality of DU network nodes coupled to the UE in a multi-connectivity radio link, the CU network node and a particular one of the plurality of DU network nodes are logically associated with a first gNB and a further one of the plurality of DU network nodes is logically associated with a second gNB.

Each quality metric report can include one or more parameters describing radio link status, and the one or more criteria may identify a reporting frequency or a reporting period for the quality metric reports. Each quality metric report may identify occurrence of one or more of a plurality of predetermined events related to the radio link, and the one or more criteria may identify which of the plurality of predetermined events to be included in the quality metric reports. The plurality of predetermined events can include a normal radio link status, a temporary radio link outage, a permanent radio link outage, and a recovery from a radio link outage. An occurrence of one of the predetermined events can be based on at least one of a link blockage duration, a link recovery duration, a link throughput below a first predetermined threshold, and a link throughput above a second predetermined threshold.

The exemplary method and/or procedure 1500 can include determining to suspend the radio link associated with the reporting DU network node based on one or more received quality metric reports indicating a temporary radio link outage and suspending delivery of traffic to the UE via the suspended radio link until at least receiving a further quality metric report indicating the end of the temporary radio link outage.

The exemplary method and/or procedure 1500 can also include determining to remove the radio link associated with the reporting DU network node based on one or more quality metric reports indicating a permanent or critical radio link outage and sending a message instructing the reporting DU network node to remove one or more DRBs comprising the radio link. The reporting DU network node can be associated with the second gNB, and the message can be sent via an Xn interface between the first gNB and the second gNB.

Determining a change in resources can include initiating an emergency handover of a single-connectivity radio link associated with the reporting DU network node based on one or more received quality metric reports indicating a permanent or critical radio link outage. The one or more quality reports may further comprise quality metrics related to one or more other radio links available for handover.

Figure 17:
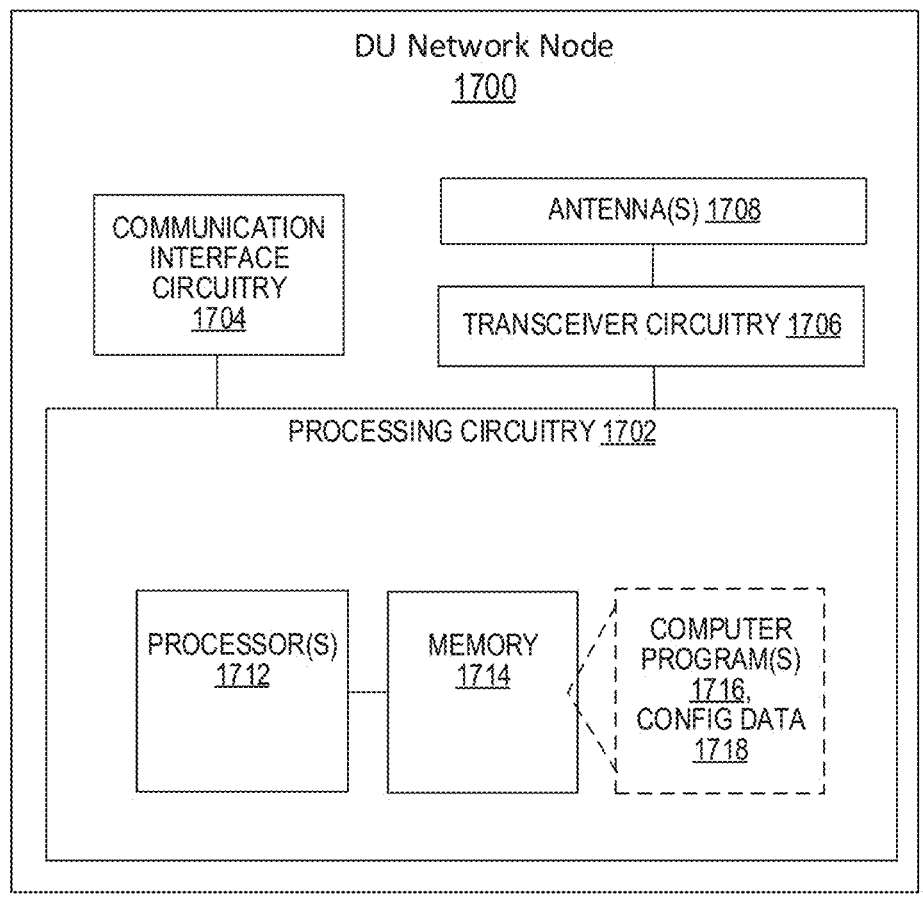
FIG. 17 is a block diagram of a DU network node, according to some embodiments.

FIG. 17 is a block diagram of an exemplary DU network node 1700 that can be configured to perform DU network node techniques corresponding and/or complimentary to those described above for the CU network node 1400. In other words, exemplary DU network node 1400 and exemplary CU network node 1400 are capable of being used together for managing resources associated with a radio link serving a UE. The DU network node 1700 can be configured to communicate with the CU network node 1400 using communication interface circuitry 1704. The DU network node 1700 can also be configured to provide an air interface to wireless devices or UEs, e.g., an LTE or 5G air interface for downlink transmission and uplink reception, which is implemented via antennas 1708 and a transceiver circuit 1706. The transceiver circuit 1706 can include transmitter circuits, receiver circuits, and associated control circuits that are collectively configured to transmit and receive signals according to a radio access technology, for the purposes of providing cellular communication services. According to various embodiments, cellular communication services can be operated according to 3GPP cellular standards, including LTE, LTE-Advanced and 5G.

Exemplary DU network node 1700 can also include one or more processing circuits 1702 that operatively associated with the communication interface circuit 1704 and/or the transceiver circuit 1706. The processing circuitry 1702 can comprise one or more digital processors 1712, e.g., one or more microprocessors, microcontrollers, DSPs, FPGAs, CPLDs, ASICs, or any mix thereof. More generally, the processing circuitry 1702 can comprise fixed circuitry, or programmable circuitry that is specially configured via the execution of program instructions implementing the functionality taught herein, or can comprise some mix of fixed and programmed circuitry.

The processing circuitry 1702 can also include a memory 1714. The memory 1714, in some embodiments, can store one or more computer programs 1716 and, optionally, configuration data 1718. The memory 1714 can provide non-transitory storage for the computer program 1716 and it can comprise one or more types of computer-readable media, such as disk storage, solid-state memory storage, or any mix thereof. By way of non-limiting example, the memory 1714 can comprise any one or more of SRAM, DRAM, EEPROM, and FLASH memory, which can be in the processing circuitry 1702 and/or separate from the processing circuitry 1702.

The processing circuitry 1702 can configure the DU network node 1700 to manage resources associated with a radio link serving a UE. The processing circuitry 1702 can be configured to receive, from a CU network node 1400 coupled to the DU network node 1700, one or more criteria relating to reporting quality metrics pertaining to the radio link. The processing circuitry 1702 can also be configured to transmit one or more quality metric reports to the CU network node 1400 in accordance with the one or more criteria and receive one or more instructions, from the CU network node 1400, for changing resources associated with the radio link serving the UE based on the one or more quality metric reports and information identifying whether the radio link is a single-connectivity link or a multi-connectivity link.

Figure 18:
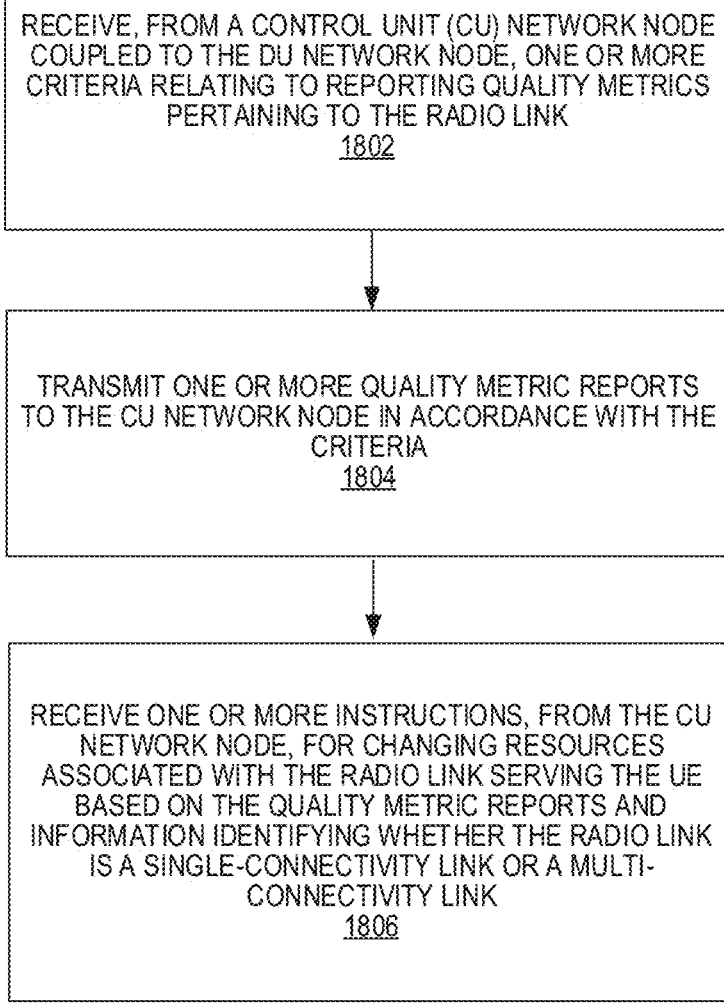
FIG. 18 illustrates a flow diagram of a method by the DU network node for managing resources associated with a radio link serving a UE, according to some embodiments.

When comprising or associated with a DU network node, the processing circuitry 1702 can be configured to perform an exemplary method and/or procedure 1800, illustrated by FIG. 18, for managing resources associated with a radio link serving the UE. Although the exemplary method and/or procedure is illustrated in FIG. 18 by blocks in a particular order, this order is exemplary and the functions corresponding to the blocks can be performed in different orders, and can be combined and/or divided into blocks having different functionality than shown in FIG. 18. Furthermore, exemplary method and/or procedure 1800 can be complimentary to exemplary method and/or procedure 1500 described above. In other words, exemplary methods and/or procedures 1500 and 1800 are capable of being used together for managing resources associated with a radio link serving a UE.

The exemplary method and/or procedure 1800 can include receiving, from a CU network node coupled to the DU network node, one or more criteria relating to reporting quality metrics pertaining to the radio link (block 1802). The exemplary method and/or procedure 1800 can include transmitting one or more quality metric reports to the CU network node in accordance with the one or more criteria (block 1804) and receiving one or more instructions, from the CU network node, for changing resources associated with the radio link serving the UE based on the one or more quality metric reports and information identifying whether the radio link is a single-connectivity link or a multi-connectivity link (block 1806).

In some cases, the exemplary CU network node 1400 and an exemplary DU network node 1700 can both be logically associated with a first gNB. In other cases, the exemplary DU network node 1700 can be associated with a first gNB and the exemplary CU network node 1400 can be associated with a second gNB coupled to the first gNB via an Xn interface.

The exemplary method and/or procedure 1800 can include, subsequent to sending one or more quality metric reports indicating a permanent or critical radio link outage, receiving an instruction from the DU network node 1700 to remove one or more DRBs comprising the radio link. The exemplary method and/or procedure 1800 can also include, subsequent to sending one or more quality metric reports indicating a permanent link outage, receiving an instruction from the DU network node 1700 for emergency handover of the radio link. In this case, the one or more quality reports further include quality metrics related to one or more other radio links available for handover.

In some exemplary embodiments, the decision to the change the radio link resources can also take place at the DU network node 1700. In such exemplary embodiments, the DU network node 1700 can be configured with criteria such as explained above, but makes the radio link resource decisions itself. For example, the DU network node 1700 can determine, based on the criteria, whether a radio link degradation should be considered as temporary or critical.

The DU network node 1700 can also be informed by the CU network node 1400 of whether a radio link is used by a UE as a single connectivity link or as a multi connectivity link. This can occur, e.g., by the CU network node 1400 signaling information for each DRB that is established or used at the DU network node 1700. The CU network node 1400 can, for example, signal to the DU network node 1700 a flag that indicates that a specific DRB is used for single connectivity or for dual connectivity by a UE. Note that while dual connectivity is discussed in these examples, this method also extends to other forms of multi-connectivity.

Some possible ways for the CU network node 1400 to send information to the DU network node 1700 include sending the information in a separate IE in the F1 Bearer Setup and/or F1 Bearer Modification messages, or in a separate IE in the F1 UE Context Setup and/or F1 UE Context Modification messages. The information can also be sent in the F1 UE context (i.e., the information is embedded in the F1 UE context). With this information, the DU network node is aware, in the case of removal of the radio link(s) serving the DRB, of whether the UE is left with other radio links on which to exchange traffic or not.

In an exemplary temporary degradation scenario, the radio link can be subject to quality degradation for a limited amount of time, after which its quality can be restored. In this case, it would be beneficial not to remove the radio link, i.e. to maintain the L1 and L2 channels associated to the link active throughput the period of quality degradation.

The DU network node 1700, in this situation, can send a message to the CU network node 1400 that it is connected to via the F1 interface, where it indicates the radio link outage event. This message can be part of control plane signaling or user plane signaling, such as being sent as part of UP traffic. This message should be interpreted as to indicate that the radio link is not removed by the DU network node 1700. The CU network node 1400 receiving this message can decide whether to suspend delivery of traffic to the DU network node 1700 until the radio link quality is back to acceptable levels. The DU network node 1700 can monitor the radio link quality and, when the radio link outage has been resolved, can send the CU network node 1400 a message indicating this status. The CU network node 1400 can then decide to forward traffic to the DU network node again, for delivery over the recovered radio link.

The DU network node 1700 can generate a similar message indicating temporary radio link degradation towards a CU network node in a different RAN node. This could be in the case where the DU network node 1700 is involved in dual connectivity connection towards a UE. This message can be delivered to the CU network node of a different gNB via the Xn interface or the X2 interface. The CU network node receiving this message may decide to suspend delivery of traffic towards the DU network node 1700 until the DU network node signals, via the same interfaces, that the radio link performance is back to acceptable levels.

In an exemplary scenario of a critical radio link outage, the DU network node 1700 can send to the CU network node 1400 connected via the F1 interface a Radio Link Removal (RLR) message. The CU network node 1400 receiving this message can take action to remove the link and configures the UE accordingly. For example, the CU network node 1400 may issue an RRC reconfiguration to the UE, according to which the UE shall remove the bearers previously served by the link that was removed. The CU network node 1400 receiving the message can also issue an SgNB removal message towards the CU network node that is F1 connected to the DU network node which detected and reported the radio link outage. The CU network node receiving the message by the DU network node may decide to add SgNBs and therefore establish more radio links towards the UE.

In the scenario where the UE is in single-connectivity, it can be beneficial and/or preferable, if possible, to maintain the radio link because there is no other radio link that has been configured for the UE. In this case, the DU network node 1700 can send the indication to the CU network node 1400 that the link is unstable (e.g., due to a sudden drop in the radio link quality). The indication can also include some information about the quality of other radio links potentially available for the UE. Such information would be based on measurements collected at the DU network node 1700. The CU network node 1400 could use this information to trigger a handover. The difference with respect to a "normal" handover is that in this case the handover is based on measurement from the DU network node 1700 (and not from the RRC measurement reports from the UE). It can be used in emergency situations when the handover needs to be fast and there is no time to wait for the RRC measurements from the UE (e.g., in case the drop in the quality of the link is abrupt and there is a risk that the UE will be lost).

Accordingly, the exemplary DU network node 1700 shown in FIG. 17 can also be configured to operate according to the techniques of this second example. The processing circuitry 1702 of the DU network node 1700 can be configured to receive, from the CU network node 1400 coupled to the DU network node 1700, an indication of whether the radio link is a single-connectivity link or a multi-connectivity link, and measure one or more quality metrics pertaining to the radio link in accordance with the one or more criteria received from an external source. The processing circuitry 1702 can also be configured to determine a change in resources associated with the radio link serving the UE based on the one or more quality metrics and the information identifying whether the radio link is a single-connectivity link or a multi-connectivity link.

Figure 19:
FIG. 19 illustrates a flow diagram of another method by the DU network node for managing resources associated with a radio link serving a UE, according to some embodiments.

When comprising or associated with a DU network node, the processing circuitry 1702 can be configured to perform an exemplary method and/or procedure 1900, illustrated by FIG. 19, for managing resources associated with a radio link serving the UE. Although the exemplary method and/or procedure is illustrated in FIG. 19 by blocks in a particular order, this order is exemplary and the functions corresponding to the blocks can be performed in different orders, and can be combined and/or divided into blocks having different functionality than shown in FIG. 19. Furthermore, exemplary method and/or procedure 1900 can be complimentary to exemplary method and/or procedure 1600 described below. In other words, exemplary methods and/or procedures 1600 and 1900 are capable of being used together for managing resources associated with a radio link serving a UE.

The exemplary method and/or procedure 1900 can include receiving, from a CU network node (e.g., 1400) coupled to the DU network node 1700, an indication of whether the radio link is a single-connectivity link or a multi-connectivity link (block 1902). The exemplary method and/or procedure 1900 can include measuring one or more quality metrics pertaining to the radio link in accordance with the one or more criteria received from an external source (block 1904) and determining a change in resources associated with the radio link serving the UE based on the one or more quality metrics and the information identifying whether the radio link is a single-connectivity link or a multi-connectivity link (block 1906). The exemplary method and/or procedure 1900 can also include receiving an indication of single-connectivity or multi-connectivity for each DRB comprising the radio link.

The exemplary method and/or procedure 1900 can include determining to suspend resources associated with the radio link based on a particular quality metric indicating a temporary radio link outage and sending a message to a CU network node (e.g., 1400) indicating the suspended radio link resources and requesting that the CU network node not direct traffic to the UE via the suspended radio link resources.

The exemplary method and/or procedure 1900 can include determining to remove resources associated with the radio link based on a particular quality metric indicating a permanent or critical radio link outage and the indication that the radio link is a multi-connectivity link and sending a message to the CU network node (e.g., 1400) indicating the removed radio link.

The exemplary method and/or procedure 1900 can include determining a need for emergency handover of the radio link based on a particular quality metric indicating a permanent or critical radio link outage and the indication that the radio link is a single-connectivity link and sending a message to the CU network node (e.g., 1400) requesting an emergency handover.

The external source can be the DU network node or an Operation and Management System (OMS). In some cases, the CU network node and the DU network node are logically associated with a first gNB. In other cases, the DU network node is logically associated with a first gNB and the CU network node is logically associated with a second gNB coupled to the first gNB via an Xn interface.

Correspondingly, the processing circuitry 1402 of the CU network node 1400 in this second example can be operable to configure the one or more DU network nodes 1700, coupled to the CU network node 1400 and the UE, with one or more criteria relating to measuring quality metrics pertaining to the radio link. The processing circuitry 1402 can also be configured to send, to the one or more DU network nodes 1700, an indication of whether the radio link is a single-connectivity link or a multi-connectivity link. The processing circuitry 1402 can be configured to receive one or more messages, from a reporting DU network node of the one or more DU network nodes 1700, indicating a change in resources associated with the radio link in accordance with the one or more criteria, and, based on the received one or more messages, perform a resource management action with respect to the radio link.

Figure 16:
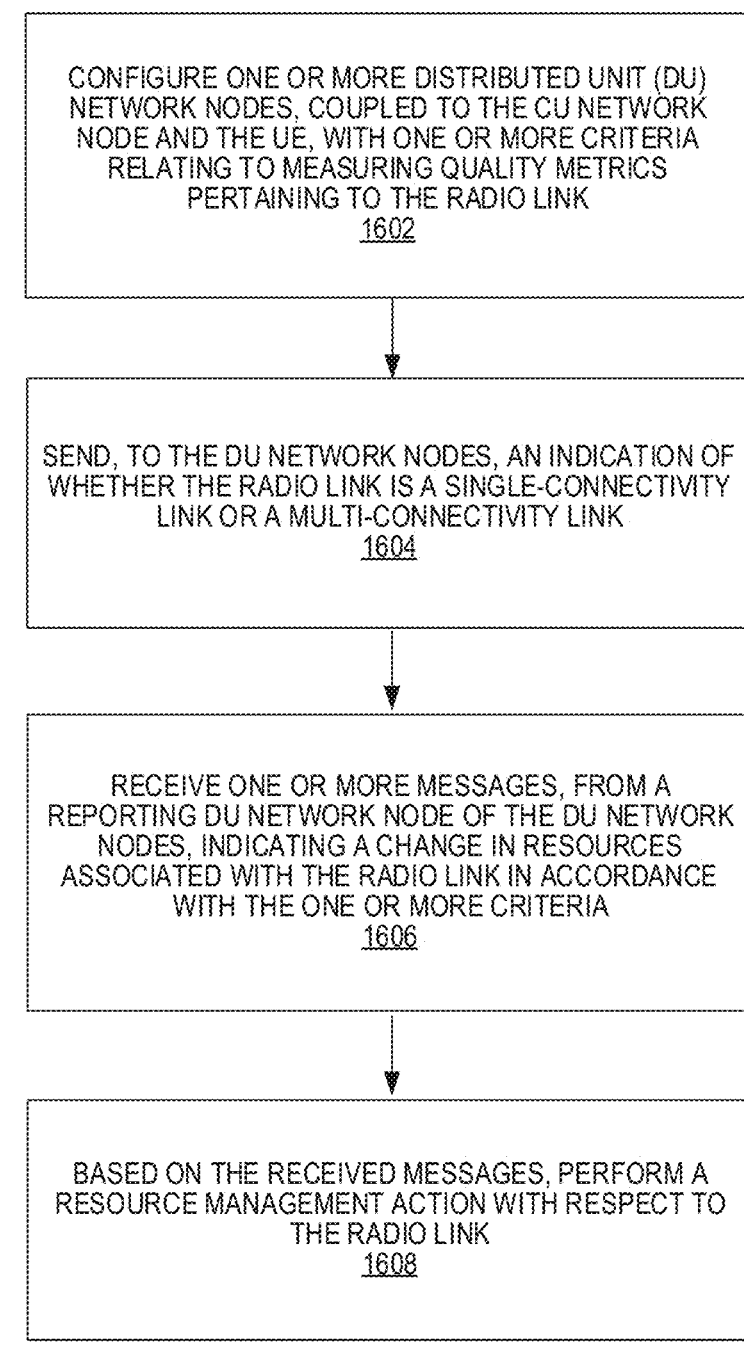
FIG. 16 illustrates a flow diagram of another method by the CU network node for managing resources associated with a radio link serving a UE, according to some embodiments.

The processing circuitry 1402 can also be configured to perform a corresponding exemplary method and/or procedure 1600 shown by FIG. 16.

When comprising or associated with a CU network node, the processing circuitry 1402 can be configured to perform an exemplary method and/or procedure 1600, illustrated by FIG. 16, for managing resources associated with a radio link serving the UE. Although the exemplary method and/or procedure is illustrated in FIG. 16 by blocks in a particular order, this order is exemplary and the functions corresponding to the blocks can be performed in different orders, and can be combined and/or divided into blocks having different functionality than shown in FIG. 16. Furthermore, exemplary method and/or procedure 1600 can be complimentary to exemplary method and/or procedure 1900 described above. In other words, exemplary methods and/or procedures 1600 and 1900 are capable of being used together for managing resources associated with a radio link serving a UE.

The exemplary method and/or procedure 1600 can include configuring one or more DU network nodes, coupled to the CU network node and the UE, with one or more criteria relating to measuring quality metrics pertaining to the radio link (block 1602). The exemplary method and/or procedure 1600 also can include sending, to the one or more DU network nodes, an indication of whether the radio link is a single-connectivity link or a multi-connectivity link (block 1604). The exemplary method and/or procedure 1600 further can include receiving one or more messages, from a reporting DU network node of the one or more DU network nodes, indicating a change in resources associated with the radio link in accordance with the one or more criteria (block 1606) and, based on the received one or more messages, performing a resource management action with respect to the radio link (block 1608).

The exemplary method and/or procedure 1600 can include sending an indication of single-connectivity or multi-connectivity for each DRB comprising the radio link. The external source can be one of the DU network node and an OMS.

In some cases, the CU network node 1400 and the one or more DU network nodes 1700 are logically associated with a first gNB. In other cases, the one or more DU network nodes 1700 can comprise a plurality of DU network nodes coupled to the UE in a multi-connectivity radio link; the CU network node 1400 and a particular one of the plurality of DU network nodes are logically associated with a first gNB; and a further one of the plurality of DU network nodes is logically associated with a second gNB.

The plurality of DU network nodes can be coupled to the UE via multiple RATs. At least a portion of the one or more parameters describing radio link status can be based on measurement reports received from the UE.

The exemplary method and/or procedure 1600 can include receiving a message from the reporting DU network node indicating suspension of radio link resources, based on a particular quality metric indicating a temporary radio link outage, and suspending delivery of traffic to the UE via the suspended radio link until at least receiving a further message indicating the end of the temporary radio link outage.

The exemplary method and/or procedure 1600 can include receiving a message from the reporting DU network node indicating removal of radio link resources, based on a particular quality metric indicating a permanent or critical radio link outage and the indication that the radio link is a multi-connectivity link and sending a message instructing the reporting DU network node to remove one or more DRBs comprising the radio link.

The exemplary method and/or procedure 1600 can include receiving a message from the reporting DU network node indicating an emergency handover of the radio link based on a particular quality metric indicating a permanent or critical radio link outage and the indication that the radio link is a single-connectivity link and initiating an emergency handover of the radio link.

Figure 20:
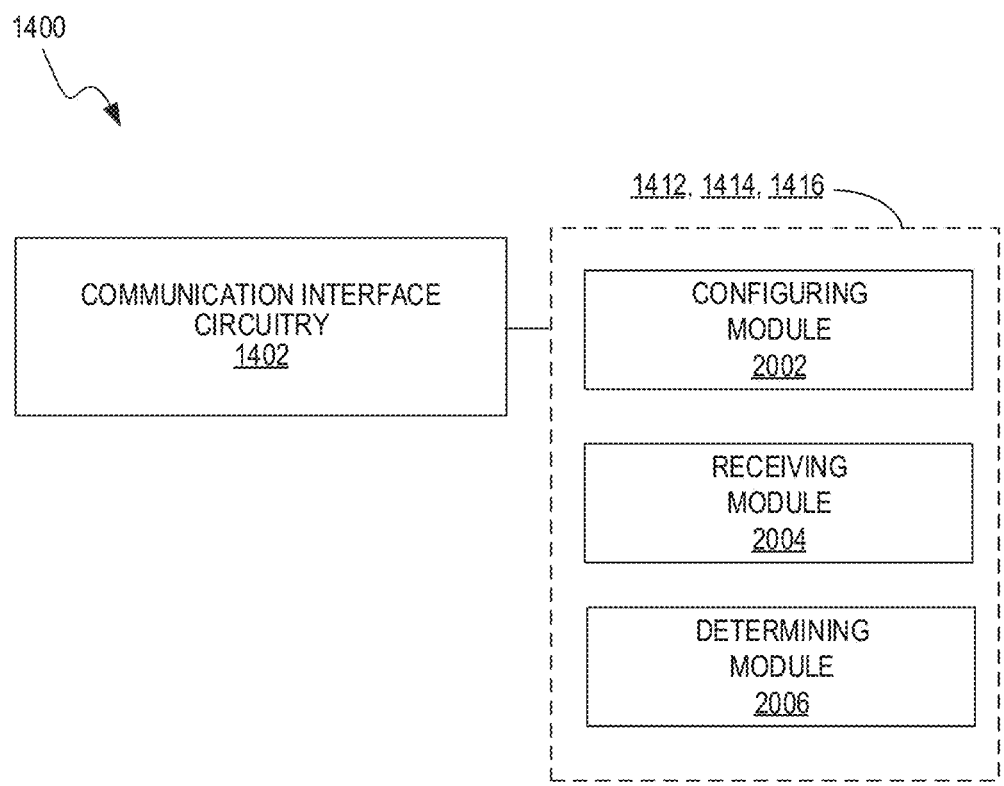
FIG. 20 is a block diagram illustrating a functional implementation of a CU network node, according to some embodiments.

FIG. 20 illustrates an exemplary functional module or circuit architecture as can be implemented in an exemplary CU network node (e.g., 1400). The illustrated exemplary embodiment at least functionally can include a configuring module 2002 for configuring at least one DU network node, coupled to the CU network node and the UE, with one or more criteria relating to reporting quality metrics pertaining to the radio link. The illustrated exemplary embodiment also can include a receiving module 2004 for receiving one or more quality metric reports, from a reporting DU network node of the one or more DU network nodes, in accordance with the one or more criteria and a determining module 2006 for determining a change in resources associated with the radio link serving the UE based on the one or more quality metric reports and information identifying whether the radio link is a single-connectivity link or a multi-connectivity link.

Figure 21:
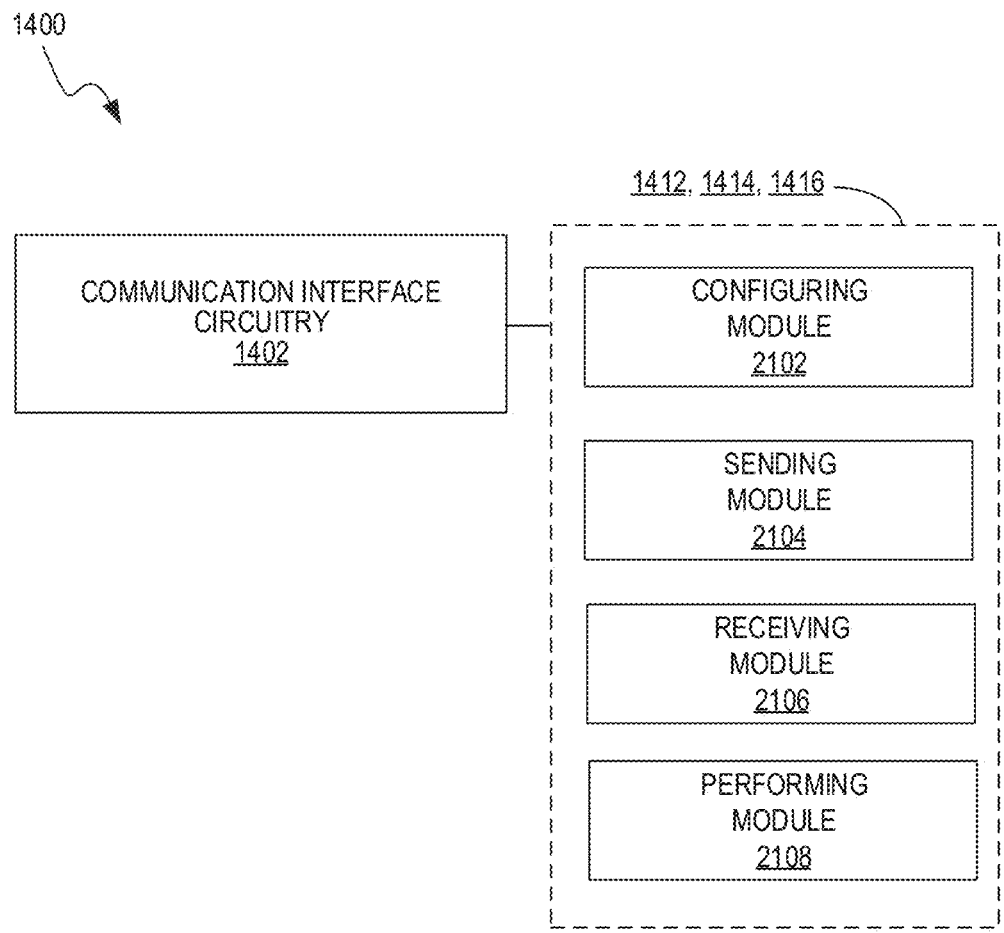
FIG. 21 is a block diagram illustrating another functional implementation of a CU network node, according to some embodiments.

FIG. 21 illustrates another exemplary functional module or circuit architecture as can be implemented in an exemplary CU network node (e.g., 1400). The illustrated exemplary embodiment at least functionally can include a configuring module 2102 for configuring one or more DU network nodes, coupled to the CU network node and the UE, with one or more criteria relating to measuring quality metrics pertaining to the radio link. The illustrated exemplary embodiment also can include a sending module 2104 for sending, to the one or more DU network nodes, an indication of whether the radio link is a single-connectivity link or a multi-connectivity link and a receiving module 2106 for receiving one or more messages, from a reporting DU network node of the one or more DU network nodes, indicating a change in resources associated with the radio link in accordance with the one or more criteria. The implementation further can include a performing module 2108 for, based on the received one or more messages, performing a resource management action with respect to the radio link.

Figure 22:
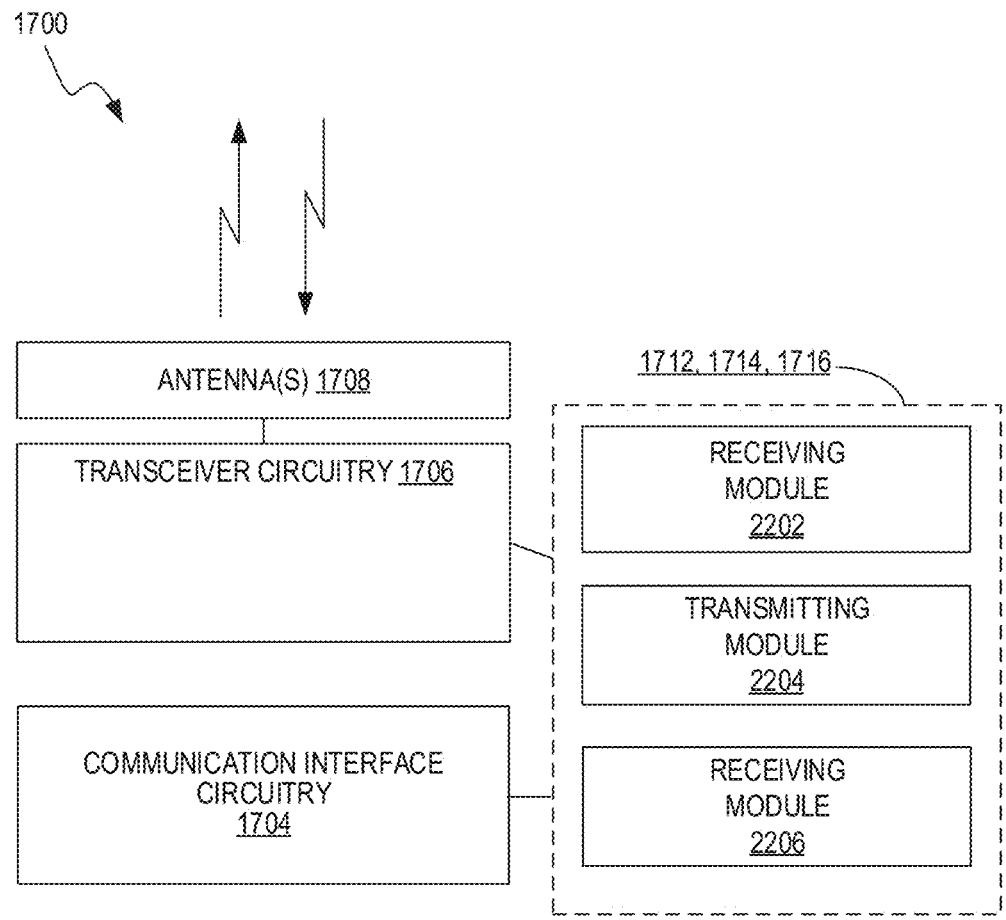
FIG. 22 is a block diagram illustrating a functional implementation of a DU network node, according to some embodiments.

FIG. 22 illustrates an exemplary functional module or circuit architecture as can be implemented in an exemplary DU network node (e.g., 1700). The illustrated exemplary embodiment at least functionally can include a receiving module 2202 for receiving, from a CU network node coupled to the DU network node, one or more criteria relating to reporting quality metrics pertaining to the radio link. The illustrated exemplary embodiment also can include a transmitting module 2204 for transmitting one or more quality metric reports to the CU network node in accordance with the one or more criteria and a receiving module 2206 for receiving one or more instructions, from the CU network node, for changing resources associated with the radio link serving the UE based on the one or more quality metric reports and information identifying whether the radio link is a single-connectivity link or a multi-connectivity link.

Figure 23:
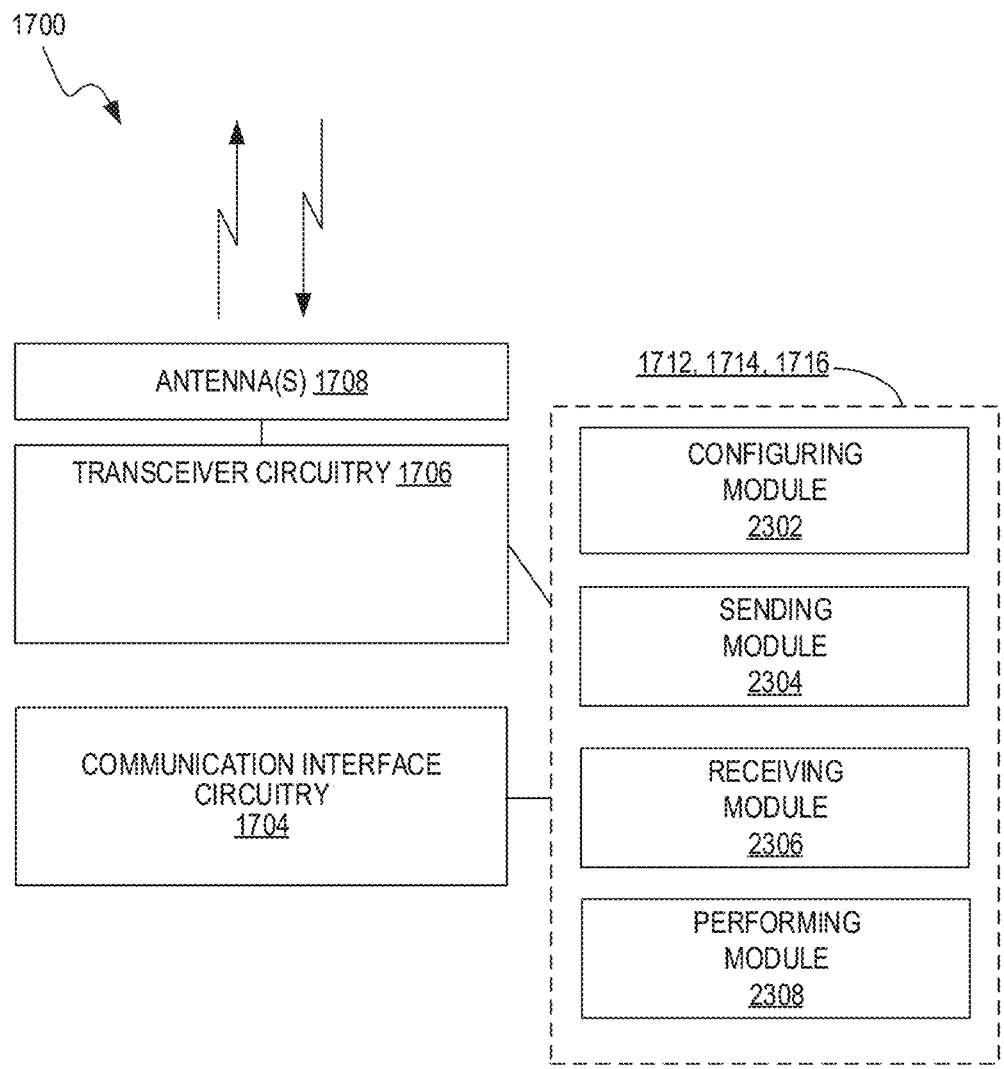
FIG. 23 is a block diagram illustrating another functional implementation of a DU network node, according to some embodiments.

FIG. 23 illustrates an exemplary functional module or circuit architecture as can be implemented in an exemplary DU network node (e.g., 1700). The illustrated exemplary embodiment at least functionally can include a configuring module 2302 for configuring one or more distributed unit (DU) network nodes, coupled to the CU network node and the UE, with one or more criteria relating to measuring quality metrics pertaining to the radio link. The illustrated exemplary embodiment also can include a sending module 2304 for sending, to the one or more DU network nodes, an indication of whether the radio link is a single-connectivity link or a multi-connectivity link and a receiving module 2306 for receiving one or more messages, from a reporting DU network node of the one or more DU network nodes, indicating a change in resources associated with the radio link in accordance with the one or more criteria. The implementation also can include a performing module 2308 for, based on the received one or more messages, performing a resource management action with respect to the radio link.

Example Embodiments

Example embodiments can include, but are not limited to, the following enumerated examples:

1. A method of operating a central unit (CU) network node to manage resources associated with a radio link serving a user equipment (UE), comprising:
    configuring one or more distributed unit (DU) network nodes, coupled to the CU network node and the UE, with one or more criteria relating to reporting quality metrics pertaining to the radio link;
    receiving one or more quality metric reports, from a reporting DU network node of the one or more DU network nodes, in accordance with the one or more criteria; and
    determining a change in resources associated with the radio link serving the UE based on the one or more quality metric reports and information identifying whether the radio link is a single-connectivity link or a multi-connectivity link.

2. The method of Embodiment 1, wherein the CU network node and the one or more DU network nodes are logically associated with a first gNB.

3. The method of Embodiment 1, wherein:
    the one or more DU network nodes comprises a plurality of DU network nodes coupled to the UE in a multi-connectivity radio link;
    the CU network node and a particular one of the plurality of DU network nodes are logically associated with a first gNB; and
    a further one of the plurality of DU network nodes is logically associated with a second gNB.

4. The method of Embodiment 3, wherein the plurality of DU network nodes are coupled to the UE via multiple radio access technologies (RATs).

5. The method of any of Embodiments 1-4, wherein:
each quality metric report of the one or more quality metric reports comprises one or more parameters describing radio link status; and
the one or more criteria identify a reporting frequency or a reporting period for the one or more quality metric reports.

6. The method of any of Embodiments 1-4, wherein:
each quality metric report of the one or more quality metric reports identifies occurrence of one or more of a plurality of predetermined events related to the radio link; and
the one or more criteria identify which of the plurality of predetermined events to be included in the one or more quality metric reports.

7. The method of Embodiment 6, wherein the plurality of predetermined events include a normal radio link status, a temporary radio link outage, a permanent radio link outage, and a recovery from a radio link outage.

8. The method of Embodiment 7, wherein an occurrence of one of the predetermined events is based on at least one of a link blockage duration, a link recovery duration, a link throughput below a first predetermined threshold, and a link throughput above a second predetermined threshold.

9. The method of Embodiment 1, wherein determining a change of the radio link resources comprises:
determining to suspend the radio link associated with the reporting DU network node based on one or more received quality metric reports indicating a temporary radio link outage; and
suspending delivery of traffic to the UE via the suspended radio link until at least receiving a further quality metric report indicating the end of the temporary radio link outage.

10. The method of Embodiment 1, wherein determining a change of the radio link resources comprises:
determining to remove the radio link associated with the reporting DU network node based on one or more quality metric reports indicating a permanent or critical radio link outage; and
sending a message instructing the reporting DU network node to remove one or more dedicated radio bearers (DRBs) comprising the radio link.

11. The method of Embodiment 10, wherein:
the CU network node is logically associated with a first gNB;
the reporting DU network node is logically associated with a second gNB; and
the message is sent via an Xn interface between the first gNB and the second gNB.

12. The method of Embodiment 1, wherein determining a change in the radio link resources comprises initiating an emergency handover of a single-connectivity radio link associated with the reporting DU network node based on one or more received quality metric reports indicating a permanent or critical radio link outage.

13. The method of Embodiment 12, wherein the one or more quality reports further comprise quality metrics related to one or more other radio links available for handover.

14. A method of operating a distributed unit (DU) network node for managing resources associated with a radio link serving a user equipment (UE), comprising:
receiving, from a central unit (CU) network node coupled to the DU network node, one or more criteria relating to reporting quality metrics pertaining to the radio link;
transmitting one or more quality metric reports to the CU network node in accordance with the one or more criteria; and
receiving one or more instructions, from the CU network node, for changing resources associated with the radio link serving the UE based on the one or more quality metric reports and information identifying whether the radio link is a single-connectivity link or a multi-connectivity link.

15. The method of Embodiment 14, wherein the CU network node and the DU network node are both logically associated with a first gNB.

16. The method of Embodiment 14, wherein the DU network node is associated with a first gNB and the CU network node is associated with a second gNB coupled to the first gNB via an Xn interface.

17. The method of any of Embodiments 14-16, wherein:
each quality metric report comprises one or more parameters describing radio link status; and
the one or more criteria identify a reporting frequency or a reporting period for the quality metric reports.

18. The method of any of Embodiments 14-16, wherein:
each quality metric report identifies occurrence of one or more of a plurality of predetermined events related to the radio link; and
the one or more criteria identify which of the plurality of predetermined events to be included in the quality metric reports.

19. The method of Embodiment 18, wherein the plurality of predetermined events include a normal radio link status, a temporary radio link outage, a permanent or critical radio link outage, and a recovery from a radio link outage.

20. The method of Embodiment 19, wherein an occurrence of one of the predetermined events is based on at least one of a link blockage duration, a link recovery duration, a link throughput below a first predetermined threshold, and a link throughput above a second predetermined threshold.

21. The method of Embodiment 14, further comprising:
subsequent to sending one or more quality metric reports indicating a permanent or critical radio link outage, receiving an instruction from the DU network node to remove one or more dedicated radio bearers (DRBs) comprising the radio link.

22. The method of Embodiment 14, further comprising:
subsequent to sending one or more quality metric reports indicating a permanent link outage, receiving an instruction from the DU network node for emergency handover of the radio link.

23. The method of Embodiment 22, wherein the one or more quality reports further include quality metrics related to one or more other radio links available for handover.

24. A method of operating a distributed unit (DU) network node for managing resources associated with a radio link serving a user equipment (UE), comprising:
receiving, from a central unit (CU) network node coupled to the DU network node, an indication of whether the radio link is a single-connectivity link or a multi-connectivity link;
measuring one or more quality metrics pertaining to the radio link in accordance with one or more criteria received from an external source; and
determining a change in resources associated with the radio link serving the UE based on the measured one or more quality metrics and the indication identifying whether the radio link is a single-connectivity link or a multi-connectivity link.

25. The method of Embodiment 24, wherein receiving the indication comprises receiving an indication of single-connectivity or multi-connectivity for each dedicated radio bearer (DRB) comprising the radio link.

26. The method of Embodiment 24, wherein determining the change in the radio link comprises:
   determining to suspend resources associated with the radio link based on a particular quality metric, among the measured one or more quality metrics, indicating a temporary radio link outage; and
   sending a message to the CU network node indicating the suspended radio link resources and requesting that the CU not direct traffic to the UE via the suspended radio link resources.

27. The method of Embodiment 24, further comprising:
   determining to remove the radio link based on a particular quality metric, among the measured one or more quality metrics, indicating a permanent or critical radio link outage and the indication that the radio link is a multi-connectivity link; and
   sending a message to the CU network node indicating the removed radio link.

28. The method of Embodiment 24, further comprising:
   determining a need for emergency handover of the radio link based on a particular quality metric, among the measured one or more quality metrics, indicating a permanent or critical radio link outage and the indication that the radio link is a single-connectivity link;
   sending a message to the CU network node requesting an emergency handover.

29. The method of Embodiment 24, wherein the external source is one of the DU network node and an Operation and Management System (OMS).

30. The method of Embodiment 24, wherein the CU network node and the DU network node are logically associated with a first gNB.

31. The method of Embodiment 24, wherein the DU network node is logically associated with a first gNB and the CU network node is logically associated with a second gNB coupled to the first gNB via an Xn interface.

32. The method of Embodiment 24, wherein:
   each quality metric of the one or more quality metrics comprises one or more parameters describing radio link status; and
   the one or more criteria identify a measurement frequency or a measurement period for the respective quality metrics.

33. The method of Embodiment 24, wherein:
   each quality of the one or more quality metrics metric identifies occurrence of one or more of a plurality of predetermined events related to the radio link; and
   the one or more criteria specify which of the plurality of predetermined events are identified by the one or more quality metrics.

34. The method of Embodiment 33, wherein the plurality of predetermined events include a normal radio link status, a temporary radio link outage, a permanent or critical radio link outage, and a recovery from a radio link outage.

35. The method of Embodiment 34, wherein an occurrence of one of the predetermined events is based on at least one of a link blockage duration, a link recovery duration, a link throughput below a first predetermined threshold, and a link throughput above a second predetermined threshold.

36. A method of operating a central unit (CU) network node to manage resources associated with a radio link serving a user equipment (UE), comprising:
   configuring one or more distributed unit (DU) network nodes, coupled to the CU network node and the UE, with one or more criteria relating to measuring quality metrics pertaining to the radio link;
   sending, to the one or more DU network nodes, an indication of whether the radio link is a single-connectivity link or a multi-connectivity link;
   receiving one or more messages, from a reporting DU network node of the one or more DU network nodes, indicating a change in resources associated with the radio link in accordance with the one or more criteria; and
   based on the received one or more messages, performing a resource management action with respect to the radio link.

37. The method of Embodiment 36, further comprising sending an indication of single-connectivity or multi-connectivity for each dedicated radio bearer (DRB) comprising the radio link.

38. The method of Embodiment 36, wherein the CU network node and the one or more DU network nodes are logically associated with a first gNB.

39. The method of Embodiment 36, wherein:
   the one or more DU network nodes comprises a plurality of DU network nodes coupled to the UE in a multi-connectivity radio link;
   the CU network node and a particular one of the plurality of DU network nodes are logically associated with a first gNB; and
   a further one of the plurality of DU network nodes is logically associated with a second gNB.

40. The method of Embodiment 39, wherein the plurality of DU network nodes are coupled to the UE via multiple radio access technologies (RATs).

41. The method of Embodiment 36, further comprising:
   receiving a message from the reporting DU network node indicating suspension of radio link resources, based on a particular quality metric, among the measured one or more quality metrics, indicating a temporary radio link outage; and
   suspending delivery of traffic to the UE via the radio link until at least receiving a further message indicating the end of the temporary radio link outage.

42. The method of Embodiment 36, further comprising:
   receiving a message from the reporting DU network node indicating removal of radio link resources, based on a particular quality metric, among the measured one or more quality metrics, indicating a permanent or critical radio link outage and the indication that the radio link is a multi-connectivity link; and
   sending a message instructing the reporting DU network node to remove one or more dedicated radio bearers (DRBs) comprising the radio link.

43. The method of Embodiment 36, further comprising:
   receiving a message from the reporting DU network node indicating an emergency handover of the radio link based on a particular quality metric, among the measured one or more quality metrics, indicating a permanent or critical radio link outage and the indication that the radio link is a single-connectivity link; and
   initiating an emergency handover of the radio link.

44. The method of Embodiment 36, wherein the external source is one of the DU network node and an Operation and Management System (OMS).

45. The method of Embodiment 36, wherein:
   each quality metric of the one or more quality metrics comprises one or more parameters describing radio link status; and
   the one or more criteria identify a measurement frequency or a measurement period for the respective quality metrics.
46. The method of Embodiment 36, wherein:
   each quality metric of the one or more quality metrics identifies occurrence of one or more of a plurality of predetermined events related to the radio link; and
   the one or more criteria specify which of the plurality of predetermined events are identified by the one or more quality metrics.
47. The method of Embodiment 46, wherein the plurality of predetermined events include a normal radio link status, a temporary radio link outage, a permanent or critical radio link outage, and a recovery from a radio link outage.
48. The method of Embodiment 47, wherein an occurrence of one of the predetermined events is based on at least one of a link blockage duration, a link recovery duration, a link throughput below a first predetermined threshold, and a link throughput above a second predetermined threshold.
49. The method of any of Embodiments 5, 17, 32, and 45, wherein at least a portion of the one or more parameters describing radio link status are based on measurement reports received from the UE.
50. A central unit (CU) network node of a radio access network, the CU node comprising:
   communication interface circuitry configured to communicate with one or more distributed unit (DU) network nodes; and
   processing circuitry operatively associated with the communication interface circuitry and configured to:
      configure the one or more DU network node, coupled to the CU network node and the UE, with one or more criteria relating to reporting quality metrics pertaining to the radio link;
      receive one or more quality metric reports, from a reporting DU network node of the one or more DU network nodes, in accordance with the one or more criteria; and
      determine a change in resources associated with the radio link serving the UE based on the one or more quality metric reports and information identifying whether the radio link is a single-connectivity link or a multi-connectivity link.
51. The CU network node of Embodiment 50, wherein the CU network node and the one or more DU network nodes are logically associated with a first gNB.
52. The CU network node of Embodiment 50, wherein:
   the one or more DU network nodes comprise a plurality of DU network nodes coupled to the UE in a multi-connectivity radio link;
   the CU network node and a particular one of the plurality of DU network nodes are logically associated with a first gNB; and
   a further one of the plurality of DU network nodes is logically associated with a second gNB.
53. The CU network node of Embodiment 50, wherein:
   each quality metric report of the one or more quality metric reports comprises one or more parameters describing radio link status; and
   the one or more criteria identify a reporting frequency or a reporting period for the one or more quality metric reports.
54. The CU network node of Embodiment 50, wherein:
   each quality metric report of the one or more quality metric reports identifies occurrence of one or more of a plurality of predetermined events related to the radio link; and
   the one or more criteria identify which of the plurality of predetermined events to be included in the one or more quality metric reports.
55. The CU network node of Embodiment 54, wherein the plurality of predetermined events include a normal radio link status, a temporary radio link outage, a permanent radio link outage, and a recovery from a radio link outage.
56. The CU network node of Embodiment 55, wherein an occurrence of one of the predetermined events is based on at least one of a link blockage duration, a link recovery duration, a link throughput below a first predetermined threshold, and a link throughput above a second predetermined threshold.
57. The CU network node of Embodiment 50, wherein the processing circuitry is configured to:
   determine to suspend the radio link associated with the reporting DU network node based on one or more received quality metric reports indicating a temporary radio link outage; and
   suspend delivery of traffic to the UE via the suspended radio link until at least receiving a further quality metric report indicating the end of the temporary radio link outage.
58. The CU network node of Embodiment 50, wherein the processing circuitry is configured to:
   determine to remove the radio link associated with the reporting DU network node based on one or more quality metric reports indicating a permanent or critical radio link outage; and
   send a message instructing the reporting DU network node to remove one or more dedicated radio bearers (DRBs) comprising the radio link.
59. The CU network node of Embodiment 58, wherein:
   the CU network node is logically associated with a first gNB;
   the reporting DU network node is logically associated with a second gNB; and
   the message is sent via an Xn interface between the first gNB and the second gNB.
60. The CU network node of Embodiment 50, wherein the processing circuitry is configured to determine a change in resources by initiating an emergency handover of a single-connectivity radio link associated with the reporting DU network node based on one or more received quality metric reports indicating a permanent or critical radio link outage.
61. The CU network node of Embodiment 60, wherein the one or more quality reports further comprise quality metrics related to one or more other radio links available for handover.
62. The CU network node of Embodiment 50, wherein the plurality of DU network nodes are coupled to the UE via multiple radio access technologies (RATs).
63. A distributed unit (DU) network node configured to manage resources associated with a radio link serving a user equipment (UE), comprising:
   communication interface circuitry configured to communicate with a central unit (CU) network node;
   transceiver circuitry configured for communicating with the UE; and
   processing circuitry operatively associated with the communication interface circuitry and transceiver circuitry and configured to:

receive, from the CU network node coupled to the DU network node, one or more criteria relating to reporting quality metrics pertaining to the radio link;

transmit one or more quality metric reports to the CU network node in accordance with the one or more criteria; and receive one or more instructions, from the CU network node, for changing resources associated with the radio link serving the UE based on the one or more quality metric reports and information identifying whether the radio link is a single-connectivity link or a multi-connectivity link.

64. The DU network node of Embodiment 63, wherein the CU network node and the DU network node are both logically associated with a first gNB.

65. The DU network node of Embodiment 63, wherein the DU network node is associated with a first gNB and the CU network node is associated with a second gNB coupled to the first gNB via an Xn interface.

66. The DU network node of any of Embodiments 63-65, wherein:
each quality metric report of the one or more quality metric reports comprises one or more parameters describing radio link status; and
the one or more criteria identify a reporting frequency or a reporting period for the one or more quality metric reports.

67. The DU network node of any of Embodiments 63-65, wherein:
each quality metric report of the one or more quality metric reports identifies occurrence of one or more of a plurality of predetermined events related to the radio link; and
the one or more criteria identify which of the plurality of predetermined events to be included in the one or more quality metric reports.

68. The DU network node of Embodiment 67, wherein the plurality of predetermined events include a normal radio link status, a temporary radio link outage, a permanent or critical radio link outage, and a recovery from a radio link outage.

69. The DU network node of Embodiment 68, wherein an occurrence of one of the predetermined events is based on at least one of a link blockage duration, a link recovery duration, a link throughput below a first predetermined threshold, and a link throughput above a second predetermined threshold.

70. The DU network node of Embodiment 69, wherein the processing circuitry is configured to, subsequent to sending one or more quality metric reports indicating a permanent or critical radio link outage, receive an instruction from the DU network node to remove one or more dedicated radio bearers (DRBs) comprising the radio link.

71. The DU network node of Embodiment 63, wherein the processing circuitry is configured to, subsequent to sending one or more quality metric reports indicating a permanent link outage, receive an instruction from the DU network node for emergency handover of the radio link.

72. The DU network node of Embodiment 71, wherein the one or more quality reports further include quality metrics related to one or more other radio links available for handover.

73. A distributed unit (DU) network node configured to manage resources associated with a radio link serving a user equipment (UE), comprising:
communication interface circuitry configured to communicate with a central unit (CU) network node; and
processing circuitry operatively associated with the communication interface circuitry and configured to:
receive, from the CU network node coupled to the DU network node, an indication of whether the radio link is a single-connectivity link or a multi-connectivity link;
measure one or more quality metrics pertaining to the radio link in accordance with the one or more criteria received from an external source; and
determine a change in resources associated with the radio link serving the UE based on the measured one or more quality metrics and the information identifying whether the radio link is a single-connectivity link or a multi-connectivity link.

74. The DU network node of Embodiment 73, wherein the processing circuitry is configured to receive the indication of single-connectivity or multi-connectivity for each dedicated radio bearer (DRB) comprising the radio link.

75. The DU network node of Embodiment 73, wherein the processing circuitry is configured to:
determine to suspend resources associated with the radio link based on a particular quality metric, among the measured one or more quality metrics, indicating a temporary radio link outage; and
send a message to the CU network node indicating the suspended radio link resources and requesting that the CU not direct traffic to the UE via the suspended radio link resources.

76. The DU network node of Embodiment 73, wherein the processing circuitry is configured to:
determine to remove resources associated with the radio link based on a particular quality metric, among the measured one or more quality metrics, indicating a permanent or critical radio link outage and the indication that the radio link is a multi-connectivity link; and
send a message to the CU network node indicating the removed radio link.

77. The DU network node of Embodiment 73, wherein the processing circuitry is configured to:
determine a need for emergency handover of the radio link based on a particular quality metric, among the measured one or more quality metrics, indicating a permanent or critical radio link outage and the indication that the radio link is a single-connectivity link;
send a message to the CU network node requesting an emergency handover.

78. The DU network node of Embodiment 73, wherein the external source is one of the DU network node and an Operation and Management System (OMS).

79. The DU network node of Embodiment 73, wherein the CU network node and the DU network node are logically associated with a first gNB.

80. The DU network node of Embodiment 73, wherein the DU network node is logically associated with a first gNB and the CU network node is logically associated with a second gNB coupled to the first gNB via an Xn interface.

81. The DU network node of any of Embodiments 73-80, wherein:
each quality metric of the one or more quality metrics comprises one or more parameters describing radio link status; and
the one or more criteria identify a measurement frequency or a measurement period for the respective quality metrics.

82. The DU network node of any of Embodiments 73-80, wherein:
   each quality metric of the one or more quality metrics identifies occurrence of one or more of a plurality of predetermined events related to the radio link; and
   the one or more criteria specify which of the plurality of predetermined events are identified by the one or more quality metrics.

83. The DU network node of Embodiment 82, wherein the plurality of predetermined events include a normal radio link status, a temporary radio link outage, a permanent or critical radio link outage, and a recovery from a radio link outage.

84. The DU network node of Embodiment 83, wherein an occurrence of one of the predetermined events is based on at least one of a link blockage duration, a link recovery duration, a link throughput below a first predetermined threshold, and a link throughput above a second predetermined threshold.

85. A central unit (CU) network node configured to manage resources associated with a radio link serving a user equipment (UE), comprising:
   communication interface circuitry configured to communicate with one or more distributed unit (DU) network nodes; and
   processing circuitry operatively associated with the communication interface circuitry and configured to:
      configure the one or more DU network nodes, coupled to the CU network node and the UE, with one or more criteria relating to measuring quality metrics pertaining to the radio link;
      send, to the one or more DU network nodes, an indication of whether the radio link is a single-connectivity link or a multi-connectivity link;
      receiving one or more messages, from a reporting DU network node of the one or more DU network nodes, indicating a change in resources associated with the radio link in accordance with the one or more criteria; and
      based on the received one or more messages, perform a resource management action with respect to the radio link.

86. The CU network node of Embodiment 85, wherein the processing circuitry is configured to send an indication of single-connectivity or multi-connectivity for each dedicated radio bearer (DRB) comprising the radio link.

87. The CU network node of Embodiment 85, wherein the CU network node and the one or more DU network nodes are logically associated with a first gNB.

88. The CU network node of Embodiment 85, wherein:
   the one or more DU network nodes comprises a plurality of DU network nodes coupled to the UE in a multi-connectivity radio link;
   the CU network node and a particular one of the plurality of DU network nodes are logically associated with a first gNB; and
   a further one of the plurality of DU network nodes is logically associated with a second gNB.

89. The CU network node of Embodiment 88, wherein the plurality of DU network nodes are coupled to the UE via multiple radio access technologies (RATs).

90. The CU network node of Embodiment 85, wherein the processing circuitry is configured to:
   receive a message from the reporting DU network node indicating suspension of radio link resources, based on a particular quality metric indicating a temporary radio link outage; and
   suspend delivery of traffic to the UE via the radio link until at least receiving a further message indicating the end of the temporary radio link outage.

91. The CU network node of Embodiment 85, wherein the processing circuitry is configured to:
   receive a message from the reporting DU network node indicating removal of radio link resources, based on a particular quality metric indicating a permanent or critical radio link outage and the indication that the radio link is a multi-connectivity link; and
   send a message instructing the reporting DU network node to remove one or more dedicated radio bearers (DRBs) comprising the radio link.

92. The CU network node of Embodiment 85, wherein the processing circuitry is configured to:
   receive a message from the reporting DU network node indicating an emergency handover of the radio link based on a particular quality metric indicating a permanent or critical radio link outage and the indication that the radio link is a single-connectivity link; and
   initiate an emergency handover of the radio link.

93. The CU network node of Embodiment 85, wherein the external source is one of the DU network node and an Operation and Management System (OMS).

94. The CU network node of Embodiment 85, wherein:
   each quality metric of the one or more quality metrics comprises one or more parameters describing radio link status; and
   the one or more criteria identify a measurement frequency or a measurement period for the respective quality metrics.

95. The CU network node of Embodiment 85, wherein:
   each quality metric of the one or more quality metrics identifies occurrence of one or more of a plurality of predetermined events related to the radio link; and
   the one or more criteria specify which of the plurality of predetermined events are identified by the one or more quality metrics.

96. The CU network node of Embodiment 95, wherein the plurality of predetermined events include a normal radio link status, a temporary radio link outage, a permanent or critical radio link outage, and a recovery from a radio link outage.

97. The CU network node of Embodiment 96, wherein an occurrence of one of the predetermined events is based on at least one of a link blockage duration, a link recovery duration, a link throughput below a first predetermined threshold, and a link throughput above a second predetermined threshold.

98. The CU network node of any of Embodiments 53, 66, 81, and 94, wherein at least a portion of the one or more parameters describing radio link status are based on measurement reports received from the UE.

99. A non-transitory computer readable storage medium storing a computer program for managing resources associated with a radio link serving a user equipment (UE), the computer program comprising program instructions that, when executed on a processing circuit of a central unit (CU) network node, cause the processing circuit to:
   configure one or more distributed unit (DU) network nodes, coupled to the CU network node and the UE, with one or more criteria relating to reporting quality metrics pertaining to the radio link;
   receive one or more quality metric reports, from a reporting DU network node of the one or more DU network nodes, in accordance with the one or more criteria; and
   determine a change in resources associated with the radio link serving the UE based on the one or more quality metric reports and information identifying whether the radio link is a single-connectivity link or a multi-connectivity link.

100. A non-transitory computer readable storage medium storing a computer program for managing resources associated with a radio link serving a user equipment (UE), the computer program comprising program instructions that, when executed on a processing circuit of a distributed unit (DU) network node, cause the processing circuit to:
receive, from a central unit (CU) network node coupled to the DU network node, one or more criteria relating to reporting quality metrics pertaining to the radio link;
transmit one or more quality metric reports to the CU network node in accordance with the one or more criteria; and
receive one or more instructions, from the CU network node, for changing resources associated with the radio link serving the UE based on the one or more quality metric reports and information identifying whether the radio link is a single-connectivity link or a multi-connectivity link.

101. A non-transitory, computer-readable medium storing computer-executable instructions that, when executed by a processing circuit of a distributed unit (DU) network node, configure the DU network node to manage resources associated with a radio link serving a user equipment (UE) by:
receiving, from a central unit (CU) network node coupled to the DU network node, an indication of whether the radio link is a single-connectivity link or a multi-connectivity link;
measuring one or more quality metrics pertaining to the radio link in accordance with the one or more criteria received from an external source; and
determining a change in resources associated with the radio link serving the UE based on the one or more quality metrics and the information identifying whether the radio link is a single-connectivity link or a multi-connectivity link.

102. A non-transitory, computer-readable medium storing computer-executable instructions that, when executed by a processing circuit of a central unit (CU) network node, configure the CU network node to manage resources associated with a radio link serving a user equipment (UE) by:
configuring one or more distributed unit (DU) network nodes, coupled to the CU network node and the UE, with one or more criteria relating to measuring quality metrics pertaining to the radio link;
sending, to the one or more DU network nodes, an indication of whether the radio link is a single-connectivity link or a multi-connectivity link;
receiving one or more messages, from a reporting DU network node of the one or more DU network nodes, indicating a change in resources associated with the radio link in accordance with the one or more criteria; and
based on the received one or more messages, performing a resource management action with respect to the radio link.

103. A central unit (CU) network node, adapted to perform a method of any of Embodiments 1-13 and 36-49.

104. A distributed unit (DU) network node, adapted to perform a method of any of Embodiments 14-35.

105. A computer program product, comprising instructions that, when executed on at least one processing circuit, cause the at least one processing circuit to carry out a method according to any one of claims 1-49.

106. A carrier containing the computer program product of claim 105, wherein the carrier is one of an electronic signal, optical signal, radio signal, or computer readable storage medium.

107. A central unit (CU) network node configured to manage resources associated with a radio link serving a user equipment (UE), comprising:
a configuring module for configuring one or more distributed unit (DU) network nodes, coupled to the CU network node and the UE, with one or more criteria relating to reporting quality metrics pertaining to the radio link;
a receiving module for receiving one or more quality metric reports, from a reporting DU network node of the one or more DU network nodes, in accordance with the one or more criteria; and
a determining module for determining a change in resources associated with the radio link serving the UE based on the one or more quality metric reports and information identifying whether the radio link is a single-connectivity link or a multi-connectivity link.

108. A distributed unit (DU) network node configured to manage resources associated with a radio link serving a user equipment (UE), comprising:
a receiving module for receiving, from a central unit (CU) network node coupled to the DU network node, one or more criteria relating to reporting quality metrics pertaining to the radio link;
a transmitting module for transmitting one or more quality metric reports to the CU network node in accordance with the one or more criteria; and
a receiving module for receiving one or more instructions, from the CU network node, for changing resources associated with the radio link serving the UE based on the one or more quality metric reports and information identifying whether the radio link is a single-connectivity link or a multi-connectivity link.

109. A distributed unit (DU) network node configured for managing resources associated with a radio link serving a user equipment (UE), comprising:
a receiving module for receiving, from a central unit (CU) network node coupled to the DU network node, an indication of whether the radio link is a single-connectivity link or a multi-connectivity link;
a measuring module for measuring one or more quality metrics pertaining to the radio link in accordance with the one or more criteria received from an external source; and
a determining module for determining a change in resources associated with the radio link serving the UE based on the one or more quality metrics and the information identifying whether the radio link is a single-connectivity link or a multi-connectivity link.

110. A central unit (CU) network node configured to manage resources associated with a radio link serving a user equipment (UE), comprising:
a configuring module for configuring one or more distributed unit (DU) network nodes, coupled to the CU network node and the UE, with one or more criteria relating to measuring quality metrics pertaining to the radio link;
a sending module for sending, to the one or more DU network nodes, an indication of whether the radio link is a single-connectivity link or a multi-connectivity link;
a receiving module for receiving one or more messages, from a reporting DU network node of the one or more DU network nodes, indicating a change in resources associated with the radio link in accordance with the one or more criteria; and a performing module for, based on the received one or more messages, performing a resource management action with respect to the radio link.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements can be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein can include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" can include any and all combinations of one or more of the associated listed items.

It will be understood that although the terms first, second, third, etc. can be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," can be used to introduce or specify a general example or examples of a previously mentioned item, and is not intended to be limiting of such item. The common abbreviation "i.e.", which derives from the Latin phrase "id est," can be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions can be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions can also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts can be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams can be separated into multiple blocks and/or the functionality of two or more blocks of the flowcharts and/or block diagrams can be at least partially integrated. Finally, other blocks can be added/inserted between the blocks that are illustrated, and/or blocks/operations can be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

What is claimed is:

1. A method of operating a central unit (CU) network node to manage resources associated with a radio link serving a user equipment (UE), the method comprising:
   configuring one or more distributed unit (DU) network nodes, coupled to the CU network node and the UE, with one or more criteria relating to reporting quality metrics pertaining to the radio link;
   receiving one or more quality metric reports, from a reporting DU network node of the one or more DU network nodes, in accordance with the one or more criteria; and
   determining a change in resources associated with the radio link serving the UE based on the one or more quality metric reports and information identifying whether the radio link is a single-connectivity link or a multi-connectivity link.

2. A method of operating a distributed unit (DU) network node to manage resources associated with a radio link serving a user equipment (UE), the method comprising:
   receiving, from a central unit (CU) network node coupled to the DU network node, one or more criteria relating to reporting quality metrics pertaining to the radio link;
   transmitting one or more quality metric reports to the CU network node in accordance with the one or more criteria; and
   receiving one or more instructions, from the CU network node, for changing resources associated with the radio link serving the UE based on the one or more quality metric reports and information identifying whether the radio link is a single-connectivity link or a multi-connectivity link.

3. A central unit (CU) network node for a radio access network (RAN), the CU node comprising:
   communication interface circuitry configured to communicate with one or more distributed unit (DU) network nodes; and
   processing circuitry operatively associated with the communication interface circuitry and configured to:
      configure the one or more DU network node with one or more criteria relating to reporting quality metrics pertaining to a radio link serving a user equipment (UE);
      receive one or more quality metric reports, from a reporting DU network node of the one or more DU network nodes, in accordance with the one or more criteria; and
      determine a change in resources associated with the radio link serving the UE based on the one or more quality metric reports and information identifying whether the radio link is a single-connectivity link or a multi-connectivity link.

4. The CU network node of claim 3, wherein the CU network node and the one or more DU network nodes are logically associated with a first gNodeB (gNB).

5. The CU network node of claim 3, wherein:
   the one or more DU network nodes comprises a plurality of DU network nodes coupled to the UE in a multi-connectivity radio link;
   the CU network node and a particular one of the plurality of DU network nodes are logically associated with a first gNodeB (gNB); and
   a further one of the plurality of DU network nodes is logically associated with a second gNB.

6. The CU network node of claim 5, wherein the plurality of DU network nodes are coupled to the UE via multiple radio access technologies (RATs).

7. The CU network node of claim 3, wherein:
   each quality metric report of the one or more quality metric reports comprises one or more parameters describing radio link status; and
   the one or more criteria identify a reporting frequency or a reporting period for the one or more quality metric reports.

8. The CU network node of claim 7, wherein at least a portion of the one or more parameters describing radio link status are based on measurement reports received from the UE.

9. The CU network node of claim 3, wherein:
   each quality metric report of the one or more quality metric reports identifies occurrence of one or more of a plurality of predetermined events related to the radio link; and
   the one or more criteria identify which of the plurality of predetermined events to be included in the one or more quality metric reports.

10. The CU network node of claim 3, wherein the processing circuitry is further configured to:
    determine to suspend the radio link associated with the reporting DU network node based on one or more received quality metric reports indicating a temporary radio link outage; and
    suspend delivery of traffic to the UE via the suspended radio link until at least receiving a further quality metric report indicating the end of the temporary radio link outage.

11. The CU network node of claim 3, wherein the processing circuitry is further configured to:
    determine to remove the radio link associated with the reporting DU network node based on one or more quality metric reports indicating a permanent or critical radio link outage; and
    send a message instructing the reporting DU network node to remove one or more dedicated radio bearers (DRBs) comprising the radio link.

12. The CU network node of claim 3, wherein the processing circuitry is configured to determine a change in resources by initiating an emergency handover of a single-connectivity radio link associated with the reporting DU network node based on one or more received quality metric reports indicating a permanent or critical radio link outage.

13. A distributed unit (DU) network node for a radio access network, the DU network node comprising:
    communication interface circuitry configured to communicate with a central unit (CU) network node;
    transceiver circuitry configured for communicating with a user equipment (UE); and
    processing circuitry operatively associated with the communication interface circuitry and transceiver circuitry and configured to:
       receive, from the CU network node, one or more criteria relating to reporting quality metrics pertaining to a radio link serving the UE;
       transmit one or more quality metric reports to the CU network node in accordance with the one or more criteria; and
       receive one or more instructions, from the CU network node, for changing resources associated with the radio link serving the UE based on the one or more quality metric reports and information identifying whether the radio link is a single-connectivity link or a multi-connectivity link.

14. The DU network node of claim 13, wherein the CU network node and the DU network node are both logically associated with a first gNodeB (gNB).

15. The DU network node of claim 13, wherein:
each quality metric report of the one or more quality metric reports comprises one or more parameters describing radio link status; and
the one or more criteria identify a reporting frequency or a reporting period for the one or more quality metric reports.

16. The DU network node of claim 15, wherein at least a portion of the one or more parameters describing radio link status are based on measurement reports received from the UE.

17. The DU network node of claim 13, wherein:
each quality metric report of the one or more quality metric reports identifies occurrence of one or more of a plurality of predetermined events related to the radio link; and
the one or more criteria identify which of the plurality of predetermined events to be included in the one or more quality metric reports.

18. A non-transitory, computer-readable storage medium storing a computer program for managing resources associated with a radio link serving a user equipment (UE), the computer program comprising program instructions that, when executed on a processing circuit of a central unit (CU) network node, configure the processing circuit to perform operations corresponding to the method of claim 1.

19. A non-transitory, computer-readable storage medium storing a computer program for managing resources associated with a radio link serving a user equipment (UE), the computer program comprising program instructions that, when executed on a processing circuit of a distributed unit (DU) network node, configure the processing circuit to perform operations corresponding to the method of claim 2.

* * * * *